United States Patent [19]

Yuasa et al.

[11] 4,291,979
[45] Sep. 29, 1981

[54] DEVICE FOR MEASURING LIGHT UNDER AMBIENT LIGHT AND/OR FLASH LIGHT AND A METHOD THEREFOR

[75] Inventors: Yoshio Yuasa, Kawachinagano; Norio Ishikawa, Osaka; Nobuyuki Taniguchi, Sakai, all of Japan

[73] Assignee: Minolta Camera Kabushiki Kaisha, Azuchi, Japan

[21] Appl. No.: 94,922

[22] Filed: Nov. 16, 1979

Related U.S. Application Data

[63] Continuation-in-part of Ser. No. 56,191, Jul. 9, 1979, abandoned.

[30] Foreign Application Priority Data

Jul. 10, 1978 [JP] Japan .................................. 53-84278

[51] Int. Cl.$^3$ .......................... G01J 1/42; G01J 1/46; G03B 7/08

[52] U.S. Cl. .................................... 356/218; 356/215; 354/24

[58] Field of Search ............... 356/218, 223, 215, 221; 354/24

[56] References Cited

U.S. PATENT DOCUMENTS 4,176,955 12/1979 Yamada et al. ................... 354/24 X Primary Examiner—John K. Corbin
Assistant Examiner—Rodney B. Bovernick
Attorney, Agent, or Firm—Wenderoth, Lind & Ponack

[57] ABSTRACT

A light measuring device for use in photography and a method therefor is disclosed, in which the quantity of light during a time interval when the flash light is present is measured and also the quantity of light under the ambient light only is measured for obtaining various exposure information for photography using the flash light.

44 Claims, 19 Drawing Figures

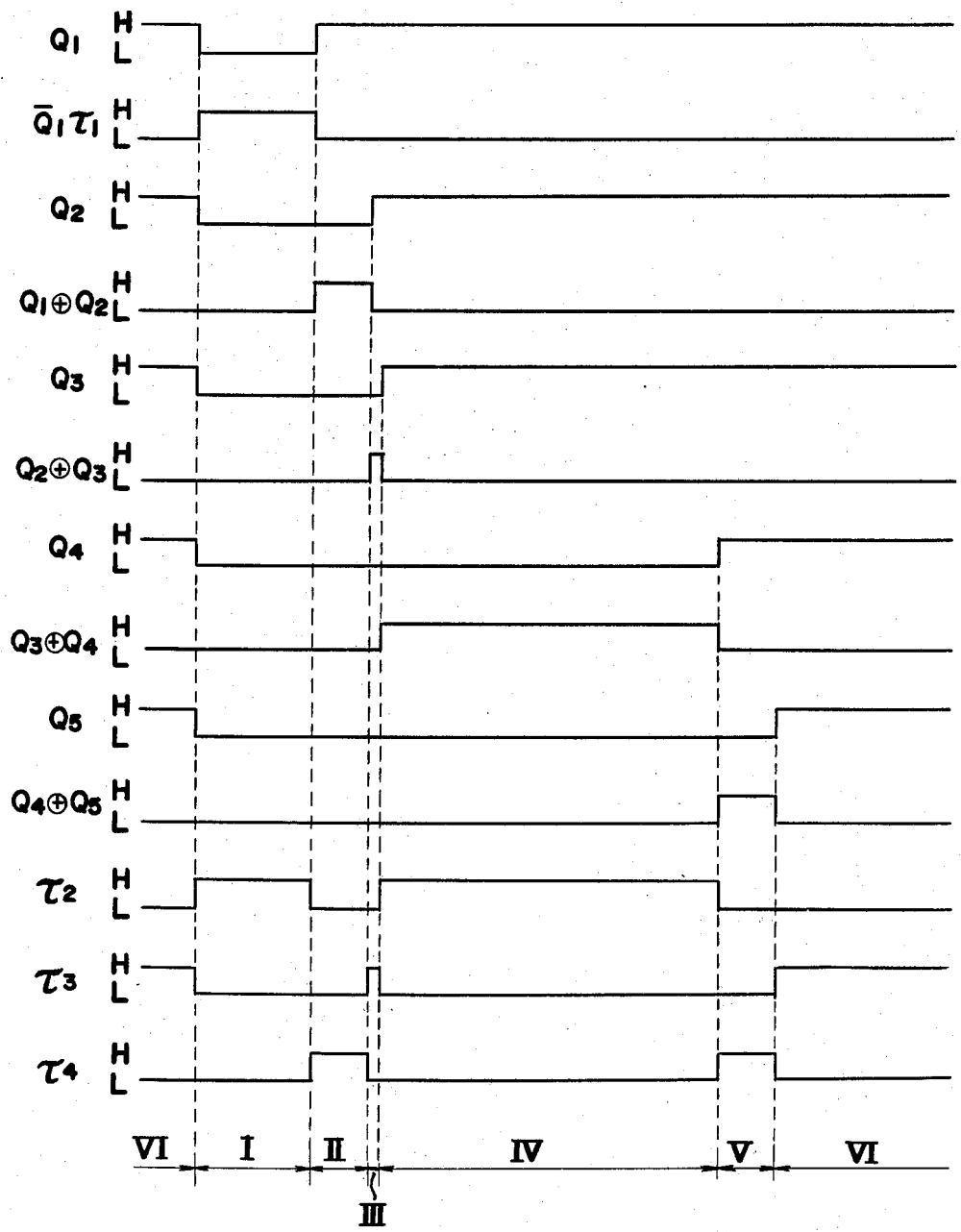

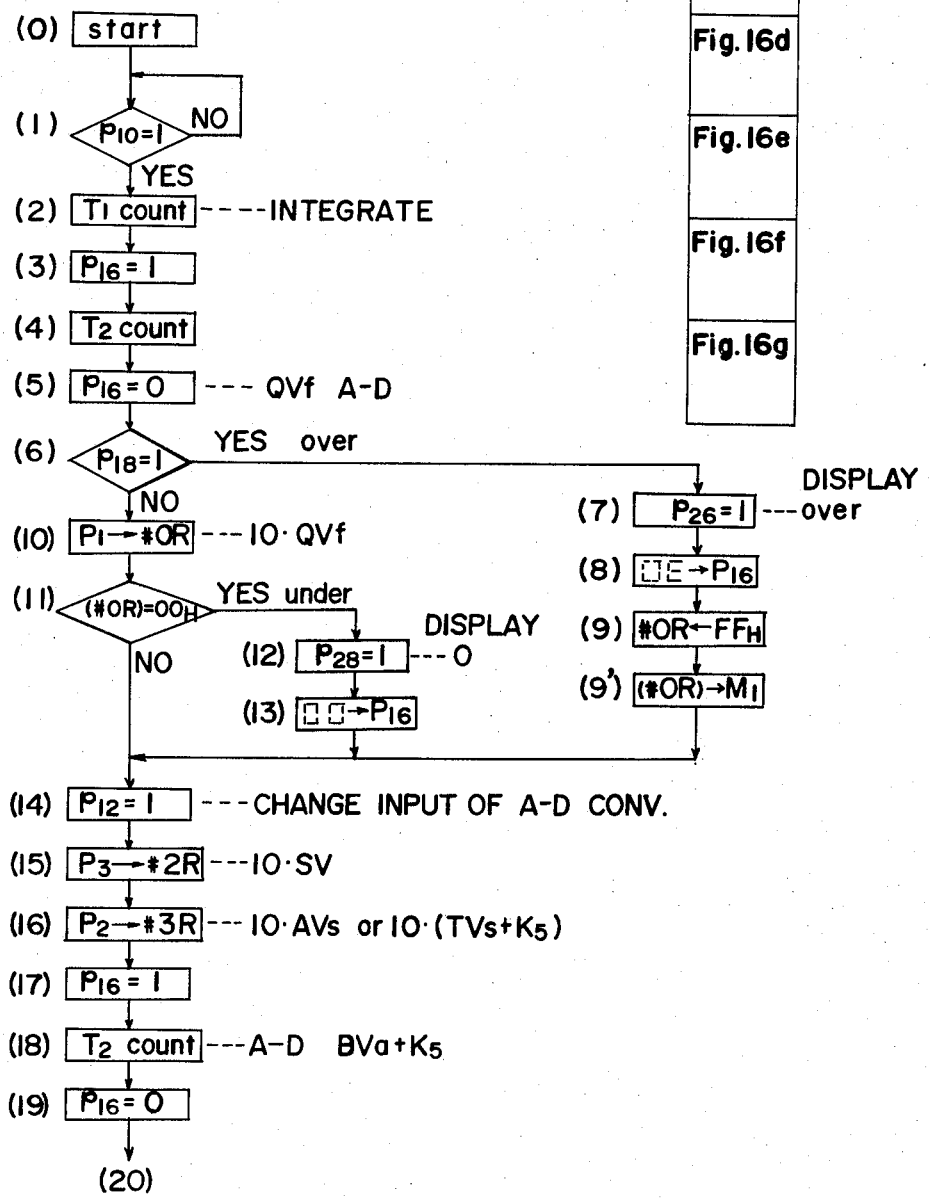

DEVICE FOR MEASURING LIGHT UNDER AMBIENT LIGHT AND/OR FLASH LIGHT AND A METHOD THEREFOR

BACKGROUND OF THE INVENTION

This application is a continuations-in-part application of application Ser. No. 56,191 now abandoned filed July 9, 1979.

The present invention relates to an exposure information measuring device and, more particularly, to a photometer or photographic device for measuring the quantity of light accompanied by flash light and, also, to a method therefor.

According to one conventional photometer of the above described type, the total quantity of light, quantity reaching or reflected on one object during a predetermined period of time (exposure time) is measured by positioning the device to receive light reaching the object or by aiming the device to the object for the predetermined period of time so that the light quantity reaching or reflected on the object can be integrated continously during said predetermined period of time. Accordingly, it is necessary to hold the photometer at the aiming position during the set exposure time. In the case where the set exposure time is considerably long, not only is it tiresome to hold the photometer in the aiming position, but also it requires a time-consuming operation. Furthermore, in the case where it is required to determine a lighting contrast, that is, a ratio of the effect of the flash light on the exposure to the effect of the ambient light on the exposure, the operator has to measure twice the quantity of light during the set exposure time in such a way that the measurement is carried out first under the ambient light only and, then, with the flash light, and he has to determine the lighting contrast by himself from the two measurement results and his experiences. Therefore, the determination of the lighting contrast is complicated and time-consuming. Thus any device for automatically determine the lighting contrast has not been known in the art.

Furthermore, according to the photometer described above, it is necessary to repeat, for obtaining an appropriate aperture value, the measuring operation each time the set exposure time is varied or the flash light value of the flash light is varied.

Moreover, in the case where it is required to measure the quantity of light under the influence of only the flash light, it is necessary to measure the quantity of light with flash light in a space without any ambient light, that is, in a dark room, which is almost impossible in the outdoors.

When the object has a deep background, the ratio of light quantity reaching or reflecting on the object which is lighted with the flash light to light quantity reaching or reflecting on the background which is too far to be lighted with the flash light is empirically determined by the operator. There have been no standardized way of expressing such ratio of brightness.

Furthermore, the increase of light quantity reaching or reflected on the object obtained as a result of using the flash light, that is, the ratio of light quantity reaching or reflected on the object with and without the flash light, is also empirically determined by the operator. Also, there have been no standardized way of expressing such ratio of brightness.

In addition, there has been proposed no method nor device for calculating and indicating an appropriate shutter speed or any other information as described above at a given aperture value with the employment of the flash light.

Although there have been proposed a device for separating the total quantity of light into the quantity of light resulting from the ambient light and that resulting from the flash light by the employment of a high-pass filter such as disclosed in any one of the Japanese Patent Publications Nos. 2756/1972, 4088/1972 and 4089/1972, such device neither calculates nor indicates the above described information.

SUMMARY OF THE INVENTION

Accordingly, it is a primary object of the present invention to provide a device for providing various data which are in relation to the quantity of light resulted solely by the light emitted from the flash light and also to a method therefor.

It is a further object of the present invention to provide a device of the above described type which provides an appropriate aperture value for the given shutter speed with the employment of the flash light added to the ambient light, and a method therefor.

It is another object of the present invention to provide a device of the above described type which instantaneously provides an appropriate aperture value without continuous measuring of the quantity of light during the given exposure time, and a method therefor.

It is still further object of the present invention to provide a device of the above described type which provides an appropriate shutter speed for the given aperture value with the employment of the flash light added to the ambient light, and a method therefor.

It is yet another object of the present invention to provide a device of the above described type which automatically measures and indicates the lighting contrast through only one sequential operation of the device.

It is a still further object of the present invention to provide a device of the above described type which provides a ratio of light quantity reaching or reflected on the object to light quantity reaching or reflected on the background in which only the object is lighted by the flash light, and a method therefor.

It is yet another object of the present invention to provide a device of the above described type which provides a ratio of light quantity reaching or reflected on the object with and without the employment of the flash light, and a method therefor.

It is a further object of the present invention to provide a device of the above described type which provides without further measuring operation a new data caused by the change in the set values such as shutter speed or aperture value, or in the quantity of the light emitted from the flash light, or in the intensity of the ambient light.

BRIEF DESCRIPTION OF THE DRAWINGS

These and further objects and advantages of the invention will be more apparent with reference to the appended drawings wherein:

FIG. 11 is a time chart of signals obtained from major points in the circuit of FIG. 10;

FIGS. 16a to 16g taken together as in FIG. 16 show a flow chart for carrying out the calculation according to the block diagram shown in FIG. 13;

DETAILED DESCRIPTION OF THE INVENTION

Before the description of a preferred embodiment of the present invention proceeds, the principle of the invention is described.

Figure 1:
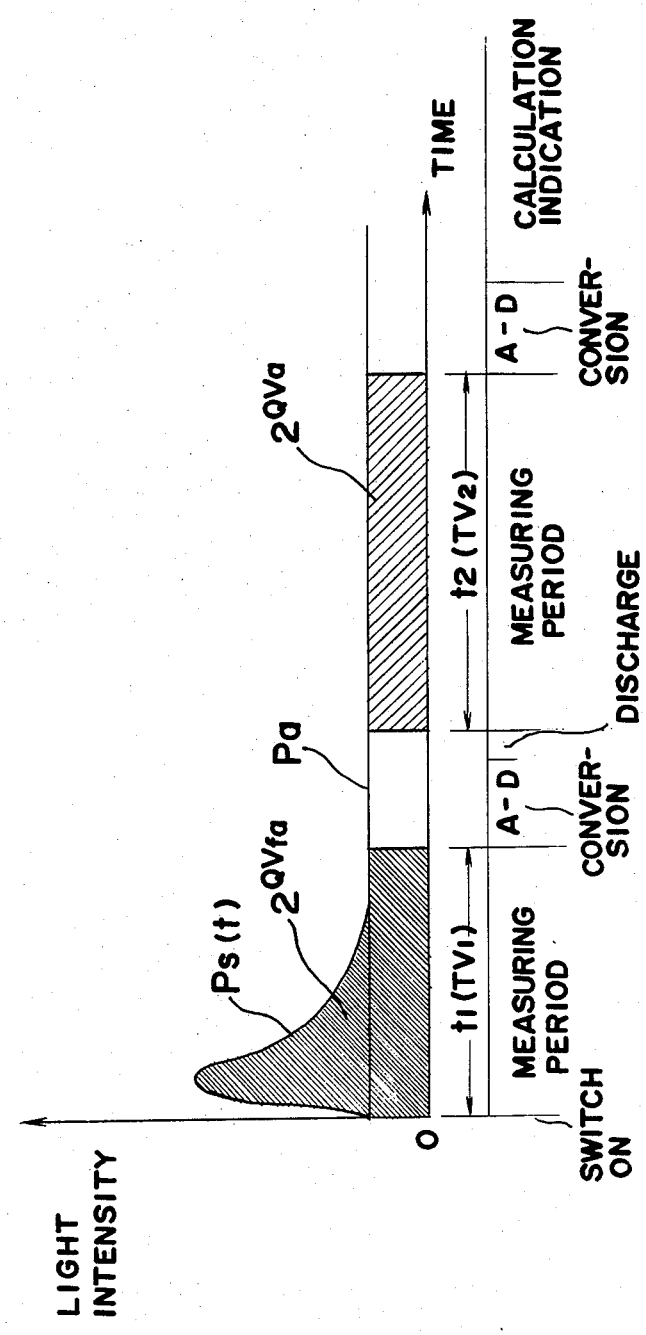
FIG. 1 is a graph showing a relation between the light intensity and the time.

Referring to FIG. 1, there is shown a graph in which the abscissa and ordinate represent time and light intensity, respectively. In the graph, a curved line Ps(t) shows a light intensity of a flash light while a straight line Pa shows a light intensity of an ambient light. A shaded area as indicated by the reference number $2^{QVfa}$ corresponds to a quantity of light resulting by the ambient light accompanied by the flash light during a predetermined time t1 which is sufficiently long to include the flash duration time. A shaded area as indicated by the reference number $2^{QVa}$ corresponds to a quantity of light resulting only by the ambient for a time period of t2. When only the flash light is available, that is, when there is no ambient, a shaded area enclosed by the curved line Ps(t) and the straight line Pa would be $2^{QVf}$. From the graph, the following equations can be obtained:

$$2^{QVfa} = \int_0^{t1} [Ps(t) + Pa]dt = 2^{QVf} + 2^{BVa-TV1}, \quad (a)$$

$$2^{QVa} = \int_0^{t2} Pa \, dt = 2^{BVa-TV2}, \quad (b)$$

wherein BVa is an intensity of ambient light and expressed by an additive system of photographic exposure (APEX system), TV1 and TV2 are respectively measuring times t1 and t2 expressed by the APEX system.

A photometer, according to the present invention, calculates the values QVfa and QVa when the exposure time TVs and film sensitivity Sv expressed in APEX values are given.

A ratio of quantity of light under the flash light only to that of the ambient only, that is, a ratio of $2^{QVf}$ to $2^{QVa}$ can be given as follows when calculated under the Apex system $$QVf - (BVa - TVs) = \Delta 2, \quad (c)$$

wherein TVs is an exposure time in general. Such ratio $\Delta 2$ is referred to as lighting contrast hereinbelow. Since the values QVfa and QVa are available by the use of a photometer, the lighting contrast $\Delta 2$ can be obtained by the difference between the values QVf and (BVa−TV) which are obtained from the values QVfa and QVa.

When $\Delta 1$ is defined as follows:

$$\Delta 1 = QVfa - (BVa - TV1), \quad (d)$$

$2^{QVf}$ is obtained from the equations (a) and (d) as follows:

$$2^{QVf} = 2^{QVfa}(1 - 2^{-\Delta 1}), \quad (e)$$

when taking the logarithm with the base 2, $$QVf = QVfa + \log_2(1 - 2^{-\Delta 1}). \quad (f)$$

BVa−TV1 can be obtained from the following equation:

$$BVa - TV1 = QVa + TV2 - TV1 \quad (g)$$

thus, in general $$BVa - TVs = QVa + TV2 - TVs. \quad (h)$$

Therefore, the lighting contrast $\Delta 2$ as defined by the equation (c) can be given by using the equations (f) and (h).

In the above step for obtaining the value QVf, the term (BVa−TV1) is eliminated as described in the equation (f). It is possible, however, to eliminate the term QVfa as shown in the following equation:

$$QVf = (Bva - TV1) + \log_2(2^{\Delta 1} - 1) \quad (f')$$

In this case, it is necessary to calculate $\log_2(2^{\Delta 1} - 1)$. Furthermore, by defining the value $\Delta 11$ as follows:

$$(BVa - TV1) - QVfa = \Delta 11 \quad (d')$$

it is possible to obtain the value QVf in a similar manner described above.

Instead of following the above steps, it is possible to obtain the value QVf by the use of a high pass filter which cuts off the value below the line Pa so that the curve above the line Pa is transmitted therethrough. The filtered value is then integrated for obtaining the value QVf.

A principle for obtaining an appropriate aperture value AVx with respect to a given exposure time TVs is now explained hereinbelow.

Generally, when the flash light is used under the daylight, the relation among the factors of aperture value AV, film sensitivity SV, intensity of ambient light BVa shutter speed TV and quantity of light QVf under the flash light only, which are all expressed by the APEX system, can be given as follows:

$$2^{SV} \cdot (2^{QVf} + 2^{BVa-TV}) = 2^{AV}. \tag{i1}$$

When only the flash light is taken into consideration, the relation can be expressed as follows:

$$2^{QVf+SV} = 2^{AVf}, \tag{i2}$$

in which AVf is an appropriate aperture value in APEX system under the flash light only. On the other hand, when only the ambient light is taken into consideration, the relation can be expressed as follows:

$$2^{BVa+SV-TV} = 2^{AVa}, \tag{i3}$$

in which AVa is an appropriate aperture value in APEX system under the ambient light only. Therefore, from the equations (i1), (i2) and (i3), the following relation is obtained:

$$2^{AVx} = 2^{AVf} + 2^{AVa}, \tag{j}$$

in which the value AVf can be given, as understood from the equation (i2), by adding the value QVf obtained from the equation (f) to the film sensitivity SV, whereas the value AVa can be obtained from the equation $$AVa = QVa + TV2 + SV - TVs,$$

which is revised equation from the equation (i3).
When defining $$AVf - AVa \equiv \Delta 20,$$

this value $\Delta 20$ is substantially equal to the lighting contrast $\Delta 2$ defined above. Therefore, $$AVf - AVa = \Delta 2, \tag{k}$$

thus, eliminating AVf from the equations (j) and (k) and taking the logarithm, we obtain, $$AVx = AVa + \log_2(1 + 2^{\Delta 2}). \tag{l}$$

Therefore, the appropriate aperture value AVx can be given by adding a value $\log_2(1+2^{\Delta 2})$ relative to the value $\Delta 2$ to the appropriate aperture value AVa under the daylight.

Instead of using the value AVf, we can obtain the appropriate aperture value AVx in a manner described hereinbelow.

First, the value AVfa is obtained through the following equation:

$$QVfa + SV = AVfa \tag{m}$$

wherein QVfa is quantity of light under the ambient light accompanied by the flash light. Then a value AVal is obtained through an equation:

$$AVal = QVa + TV2 + SV - TVs1 \tag{n}$$

wherein TVs1=TVs−TV1, that is, the remaining time duration as a result of subtraction of the flashing time TV1 from the whole exposure time TVs. Since $$2^{AVx} = 2^{AVfa} + 2^{AVal} \tag{j'}$$

the value AVs can be obtained in a similar manner described above.

The manner in which the value TVs1 is obtained is described. The relation among the values TVs1, TVs and TV1 can be expressed as follows:

$$2^{-TVs1} = 2^{-TVs} - 2^{-TV1} \tag{$\alpha$}$$

when $\Delta 4$ is defined as follows:

$$\Delta 4 \equiv TV1 - TVs (>0) \tag{$\beta$}$$

the value TVs1 as given in the equation ($\alpha$) can be obtained as follows:

$$TVs1 = TVs - \log_2(1 - 2^{-\Delta 4}) \tag{$\gamma$}$$

In the case where the exposure time is changed from TVs to TVs', the above equation (h) is varied as follows:

$$BVa - TVs' = QVa + TV2 - TVs' \tag{h'}$$

and thus, the lighting contrast is changed as follows:

$$\Delta 2' = QVf - (BVa - TVs') \tag{c'}$$

thus, the appropriate aperture value AVx' can be obtained by the following equation:

$$AVx' = AVa' + \log_2(1 + 2^{\Delta 2'}) \tag{l'}$$

in which $AVa' = QVa + TV2 + SV - TVs'$.

Furthermore, in the case where the quantity of light of the flash light is changed, that is, when the guide number of the flash light is changed, the quantity of light with respect to the flash light is varied as follows:

$$QVf' = QVf - \Delta f \tag{p}$$

in which $\Delta f$ is the amount of change in quantity of the light from the flash light. Therefore, the lighting contrast can be given as follows:

$$\Delta 2'' = QVf' - (BVa - TVs) \tag{c''}$$

Thus, the appropriate aperture value AVx" can be obtained from the following equation:

$$AVx'' = AVa + \log_2(1 + 2^{\Delta 2''}). \tag{l''}$$

When the object to be photographed has a deep background, the light emitted from the flash light may not have a sufficient intensity over such deep background. Therefore, there is a considerable difference in quantity of the incident light between the object and the background. When the exposure time TVs is given, the total quantity of light $2^{QVt}$ obtained by the ambient light accompanied by the flash light can be expressed as follows:

$$2^{QVf} + 2^{BVa-TVs} = 2^{QVt} \tag{q}$$

while the contrast between the object and the background can be expressed as follows:

$$Qvt - (BVa - TVs). \tag{r}$$

When the equation (i1) is taken into consideration, the equation (q) can be revised as follows:

$$2^{AVf}+2^{AVa}+2^{AVx} \qquad (j)$$

Therefore, the equation (r) can be rewritten as follows:

$$AVx-AVa \qquad (r')$$

which is substantially equal to $\log_2(1+2^{\Delta 2})$. In other words, the value $\log_2(1+2^{\Delta 2})$ can be understood as indicating the contrast between the object and the background. The value $\log_2(1+2^{\Delta 2})$ is taken into consideration from another point of view.

The ratio of the quantity of light reaching or reflected on the object with and without the flash light can be determined by the difference between the value Qvt as obtained from the above equation (q) and the value $BVa-TVs$ obtained from the quantity of light $2^{BVa-TVs}$ under the ambient only. Such difference is also substantially equal to the value $\log_2(1+2^{\Delta 2})$. In other words, the value $\log_2(1+2^{\Delta 2})$ can be understood as indicating the ratio of the quantity of light reaching or reflected on the object between the photographs with and without the flash light.

A principle for obtaining an appropriate shutter speed TVx with respect to a given aperture AVs is now explained hereinbelow.

Generally, when using the flash light under the daylight, the relation among the factors of given aperture value AVs, film sensitivity SV, intensity of ambient light BVa only, quantity of light QVf under the flash light only and shutter speed TVx in question, which are all expressed by the APEX system, can be given as follows:

$$2^{SV} \cdot (2^{QVf}+2^{BVa-TVx})=2^{AVs} \qquad (i10)$$

Since the value QVf can be obtained through a similar manner described above, the value $AVf=QVf+SV$ can be obtained accordingly. Furthermore, an appropriate shutter speed TVa under the ambient light only is obtained from the following equation:

$$TVa=BVa+SV-AVs.$$

When $\Delta 3$ is defined as $$\Delta 3 \equiv AVs-AVf, \qquad (s)$$

the equation (i10) can be rewritten through the elimination of AVf and by taking logarithm as follows:

$$TVx=TVa-\log_2(1-2^{-\Delta 3}). \qquad (u)$$

In the equation (u), when $\Delta 3=AVs-AVf<\alpha(\alpha>0)$, the calculated TVx will become shorter than the minimum shutter speed available so that it is necessary to indicate that the exposure will become over. When the shutter speed in question TVx is obtained, the lighting contrast for this case can be defined as follows:

$$\Delta 21 = QVf-(BVa-TVx) \qquad (C''')$$

It is to be noted that the value of the calculated shutter speed TVx can be corrected automatically in accordance with change in given aperture value AVs and/or in quantity of the flash light in a similar manner described above.

Furthermore, the contrast between the object which is within the range of flash light and the background which is beyond the reach of flash light, or the ratio of the quantity of light on the object between the photographs with and without the flash light can be given by $\log_2(1+2^{\Delta 21})$.

In summary, values QVf, $\Delta 2$, AVx, $\log_2(1+2^{\Delta 2})$, TVx, $\Delta 21$ and $\log_2(1+2^{\Delta 21})$ are calculated from the measured data QVfa and QVa.

The description is now directed to the manner in which the logarithmic value such as $\log_2(1-2^{-\Delta 1})$, $\log_2(1+2^{\Delta 2})$, $\log_2(1-2^{-\Delta 3})$ or $\log_2(1+2^{\Delta 21})$ is calculated. Since the photometer in general can detect the quantity of light as accurate as 0.1 EV order, in which EV is a unit used for the APEX system, the calculating system according to the present invention employs a calculation circuit in which the values of $\log_2(1-2^{-\Delta})$ and $\log_2(1+2^{\Delta})$ are previously memorized with respect to different values of $\Delta$. In this case, a decoder or ROM (read only memory) can be employed for reading out the memory. Furthermore, when a micro-computer is used, $\Delta$ is classified by its value into one of a plurality of areas and the required value $\log_2(1-2^{-\Delta})$ or $\log_2(1+2^{\Delta})$ corresponding to the area into which $\Delta$ is classified can be obtained. Table 1 shows a list of a calculated value for $-10 \cdot \log_2(1-2^{-\Delta a})$ with respect to various $\Delta a$ in which $\Delta a$ is a general representation for the values $\Delta 1$ and $\Delta 3$.

TABLE 1

| $10 \cdot \Delta a$ | $-10 \cdot \log_2(1-2^{-\Delta a})$ | $10 \cdot \Delta a$ | $-10 \cdot \log_2(1-2^{-\Delta a})$ |
|---|---|---|---|
| 00H | ∞ | 0AH | 0AH |
| 01H | 27H | 0BH | 09H |
| 02H | 1EH | 0CH~0DH | 08H |
| 03H | 18H | 0EH | 07H |
| 04H | 14H | 0FH~10H | 06H |
| 05H | 12H | 11H~13H | 05H |
| 06H | 10H | 14H~16H | 04H |
| 07H | 0EH | 17H~1AH | 03H |
| 08H | 0CH | 1BH~21H | 02H |
| 09H | 0BH | 22H~30H | 01H |
|  |  | 31H~ | 00H |

The reference character H given after each number in Table 1 and in other places in the specification indicates the numbering system with base 16 which is called a hexadecimal numbering system. Since there are 16 digits in this system, six additional characters are used to represent digits, in addition to the ten numerical digits. In the hexadecimal numbering system, therefore, the digits are 0, 1, 2, 3, 4, 5, 6, 7, 8, 9, A, B, C, D, E, F.

For the value $\log_2(1+2^{\Delta b})$ with various $\Delta b$ in which $\Delta b$ is a general representation for the values $\Delta 2$ and $\Delta 21$, it is necessary first to discriminate whether the value $\Delta b = AVa-AVf$ is positive or negative. When $AVa \leq AVf$, it is defined that $AVa-AVf=\Delta b1$. On the other hand, when $AVa>AVf$, it is defined that $AVa-AVf=\Delta b2$. The value $\log_2(1+2^{\Delta b})$ for these values $\Delta b1$ and $\Delta b2$ can be obtained by the use of the following Table 2.

TABLE 2

| $10 \cdot (\Delta b + 39)$ | $10 \cdot \log_2(1 + 2^{\Delta b})$ |
|---|---|
| ~00H | 00H |
| 01H | 01H |
| 02H~0CH | 02H |
| 0DH~12H | 03H |
| 13H~17H | 04H |
| 18H~1AH | 05H |
| 1BH~1DH | 06H |
| 1FH~20H | 07H |
| 21H~23H | 08H |
| 24H~25H | 09H |
| 26H~27H | 0AH |

With respect to $\Delta b1$, AVx is obtained by the use of the following equation:

$$AVx = AVf + \log_2(1 + 2^{\Delta b1}) \tag{1a}$$

On the other hand, with respect to $\Delta b2$, AVx is obtained by the use of the following equation:

$$AVx = AVa + \log_2(1 + 2^{\Delta b2}) \tag{1b}$$

Now, a detailed description of the preferred embodiments of the present invention is made hereinbelow with reference to the attached drawings.

Before the description of preferred embodiments proceed, it is to be noted that like parts are designated by like reference numerals throughout the accompanying drawings.

Figure 2:
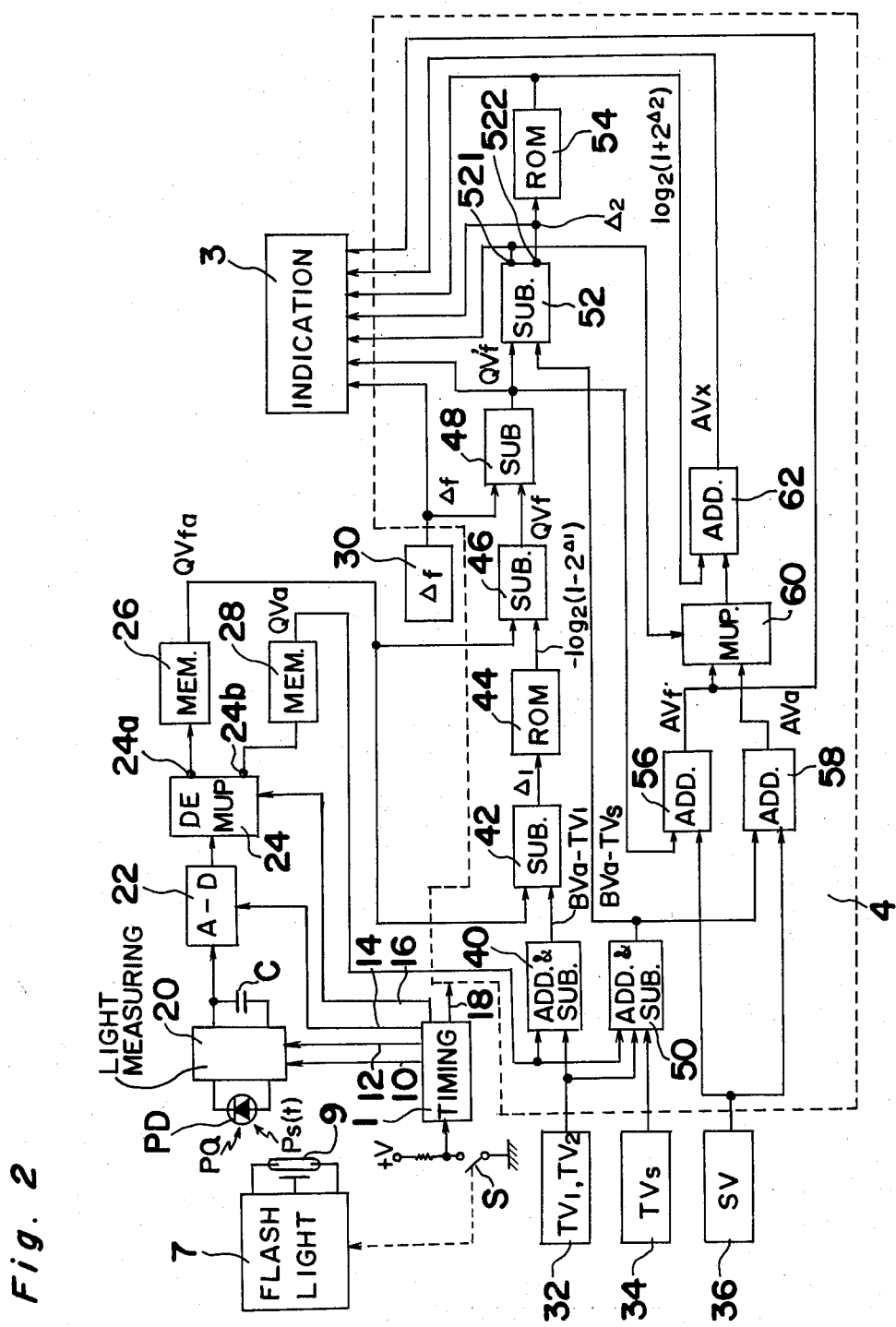
FIG. 2 is a block diagram of a photometer or light measuring device according to one embodiment of the present invention.

Referring to FIG. 2, there is shown a block diagram of a photometer according to the present invention. In FIG. 2, a reference character S designates a switch operatively associated with a button switch (not shown) provided on the device for starting the light measuring. This switch S is also coupled with a flash light 7 such as strobe for generating the flash light from a main light emitting tube 9 upon closure of the switch S. A reference numeral 1 designates a timing controller which controls the sequential operation of the entire light measuring device. A reference character PD designates a light receiving element, a reference numeral 20 designates a light measuring circuit and a reference character C designates a capacitor for the integration of successively coming signal indicative of the light intensity and for producing a signal indicative of the quantity of measured light.

The network including the light receiving element PD and the capacitor C operates in such a manner as to integrate the current in relation to the output current of the light receiving element PD and to produce across the capacitor C an output voltage which is logarithmically compressed value of the integrated value. Such network is disclosed in detail in Japanese Patent Publication No. 28038/1975 and, therefore, a further description therefor is omitted for the sake of brevity.

A reference numeral 22 designates an analog-digital converter (hereinafter referred to as A-D converter) and a reference number 24 designates a demultiplexer which transmits the output signal from the A-D converter 22 to either one of its outputs 24a and 24b selectively upon receipt of timing signal from a terminal 16 of the timing controller 1. Reference numerals 26 and 28 designate registers for memorizing the signal QVfa (signal indicative of the quantity of ambient light accompanied by the flash light) and signal QVa (signal indicative of the quantity of ambient light only), respectively.

A reference numeral 30 designates a circuit for producing a signal indicative of change in quantity of light in the flash light. It is to be noted that the flash light 7 is so designed that the guide member can manually be adjustable. A reference numberal 32 designates a circuit for producing fixed data corresponding to APEX values TV1 and TV2 (FIG. 1) which are relative to the light measuring time t1 and t2 taken by the light measuring circuit 20. A reference numeral 34 is a circuit for producing a signal indicative of the APEX exposure time value TVs given and set by the operator, while a reference numeral 36 is a circuit for producing a signal indicative of the APEX film sensitivity value SV given and set by the operator.

A network 4 enclosed by a broken line is a calculation circuit for calculating lighting contrast $\Delta 2$, quantity of light QVf from the flash light, appropriate aperture value AVf under the flash light only, appropriate aperture value AVx, and the value $\log_2(1 + 2^{\Delta 2})$ by the use of given information of measured data QVfa and QVa, manually set data TVs, SV and $\Delta f$ and fixed data TV1 and TV2. An indication circuit 3 is connected to the calculation circuit 4 for indicating the various data from the network 4 and also from the circuit 30 for indicating the change in guide number of the flash light 7. The detail of the network 4 and the manner in which the indication circuit 3 is operated are described hereinbelow in relation to the operation of the circuit shown in FIG. 2.

Upon closure of the switch S, the main light emitting tube 9 of the flash light 7 produces the light and, at the same time, a terminal 10 of the timing controller 1 produces a first timing signal to the light measuring circuit 20. Thereupon, the light measuring circuit 20 starts the measurement of the quantity of light. After a predetermined period of time t1 (FIG. 1), the timing controller 1 produces a second timing signal from the terminal 10 for completing a first measuring operation in the light measuring circuit 20. During the first measuring operation, the capacitor C in the measuring circuit 20 is charged with a voltage corresponding to the signal QVfa, that is, logarithmically compressed value of the quantity of light obtained through the light receiving element PD. This charged voltage which is expressed in the form of analog is converted into digital form in the A-D converter 22 in accordance with a timing signal applied to the A-D converter 22 from a terminal 14 of the timing controller 1. The digital signal as converted in the A-D converter 22 is transmitted through the demultiplexer 24 to the register 26 which memorizes the value QVfa. Upon completion of storage of the value QVfa in the register 26, a timing signal is produced from a terminal 12 of the timing controller to the light measuring circuit 20 for discharging the capacitor C and, immediately thereafter, upon receipt of a third timing signal from the terminal 19, the light measuring circuit 1 again starts the measurement of the incident light for a time duration of t2 (FIG. 1). During this second measuring operation, the capacitor C in the measuring circuit 20 is charged with a voltage corresponding to the signal QVa. This charged voltage is also converted into digital form in the A-D converter 22, in turn, the converted digital signal is transmitted through the demultiplexer 24 to the register 28 in accordance with the timing signal from the terminal 16 of the timing controller 1.

After the values QVfa and QVa are memorized in the registers 26 and 28, respectively, in the manner described above, the timing controller 1 produces a timing signal from a terminal 18 thereof for actuating the calculation circuit 4. In a first addition and subtraction circuit 40, a calculation of $QVa + TV2 - TV1 = BVa - TV1$ is carried out and, in a subtraction circuit 42, a calculation of $QVfa - (BVa - TV1) = \Delta 1$ is carried out for obtaining $\Delta 1$. A signal indicative of $\Delta 1$ is applied to a ROM (read only memory) 44 in which the signal $\Delta 1$ is used for pointing out an address of the place where the value corresponding to $-\log_2(1 - 2^{-\Delta 1})$ is memorized. Thereafter, the value corresponding to $-\log_2(1 - 2^{-\Delta 1})$ is transmitted from the ROM 44 to a subtraction circuit 46 in which a calculation of $QVfa + \log_2(1-2^{-\Delta 1}) = QVf$ is carried out for obtaining the quantity of light under the flash light only. A signal indicative of this value QVf is then applied to another subtraction circuit 48 in which a signal $\Delta f$ indicative of reduction of light in the flash light, if there is any, is subtracted from the value QVf for the correction. The corrected value QVf' is applied to the indication circuit 3 together with the signal $\Delta f$ for the indication thereof.

On the other hand, in a second addition and subtraction circuit 50, the signal indicative of the value QVa from the register 28, the signal indicative of the fixed value TV2 from the circuit 32 and the signal indicative of the set value TVs are used for carrying out a calculation $QVa + TV2 - TVs = BVa - TVs$. The output signal indicative of the value BVa-TVs from the circuit 50 is applied to a subtraction circuit 52 where it is subtracted from the value QVf' which has been obtained from the circuit 48. Therefore, in the subtraction circuit 52, a calculation $QVf' - (BVa - TVs) = \Delta 2$ is carried out. A first output 521 of the circuit 52 produces a binary signal for indicating that the output $\Delta 2$ is positive or negative value, whereas a second output 522 thereof produces a signal indicative of the value $\Delta 2$ which is substantially equal to the lighting contrast. These two signals from the outputs 521 and 522 are also applied to the indication circuit 3 for the indication thereof.

An addition circuit 56 receives the signal QVf' from the subtraction circuit 48 and also the signal SV from the setting circuit 36 for carrying out a calculation of $QVf' + SV = AVf$ for obtaining the appropriate aperture value AVf under the flash light only. This value AVf is also applied to the indication circuit 3 for the indication thereof.

Another addition circuit 58 receives the signal BVa-TVs from the circuit 50 and also the signal SV from the subtraction circuit 36 for carrying out a calculation of $BVa - TVs + SV = AVa$ for obtaining the appropriate aperture value AVa under the daylight only.

The output signal $\Delta 2$ from the subtraction circuit 52 is applied to a ROM 54 in which the data $\Delta 2$ is used for pointing out an address of the place where the value corresponding to $\log_2(1 + 2^{\Delta 2})$ is memorized. The output value $\log_2(1 + 2^{\Delta 2})$ is applied to the indication circuit 3 for the indication thereof. The value $\log_2(1 + 2^{\Delta 2})$ is indicated as representing the contrast between the object and the background or as representing the ratio of the quantity of light reaching or reflecting on the object between the photographs with and without the flash light, depending on the viewpoint of consideration.

When the binary signal from the terminal 521 of the subtraction circuit 52 is low, that is, when $AVf \geq AVa$, a multiplexer 60 transmits the data AVf from the addition circuit 56 to an addition circuit 62 and, at the same time, the data AVa from the addition circuit 58 is cut off. On the other hand, when the binary signal from the terminal 522 of the subtraction circuit 52 is high, that is, when $AVf < AVa$, the multiplexer 60 operates in an opposite manner, that is, to transmit the signal AVa and to cut off the signal AVf. Therefore, an addition circuit 62 carries out either one of the calculations of $AVf + \log_2(1 + 2^{\Delta 2})$ and $AVa + \log_2(1 + 2^{\Delta 2})$ for producing an appropriate aperture data AVx for the photographs with flash light.

Figure 3:
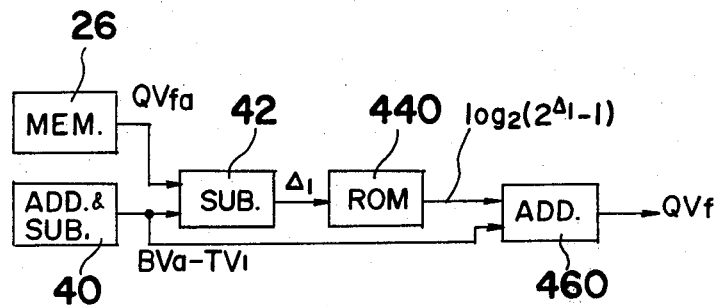
FIGS. 3 to 6 are block diagrams showing modifications of a part in the block diagram shown in FIG. 2.
Figure 4:
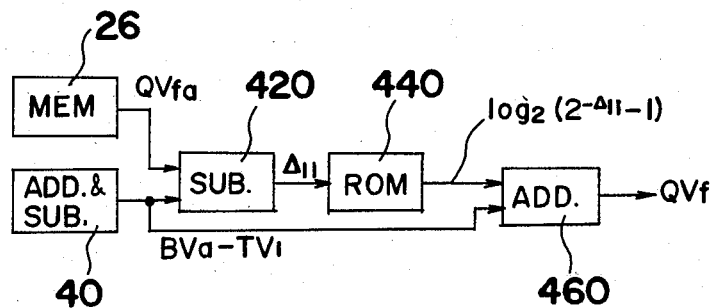
Figure 5:
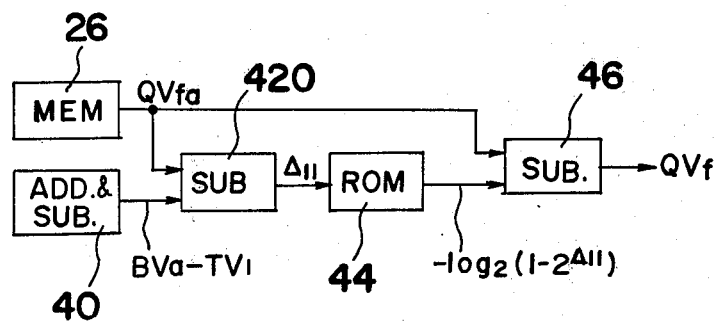

FIGS. 3, 4 and 5 show block diagrams for obtaining the signal QVf, which are modifications of the embodiment shown in FIG. 2.

Referring particularly to FIG. 3, the subtraction circuit 42 carries out the calculation $QVfa - (BVa - TV1) = \Delta 1$, while a ROM 440 produces a data indicative of $\log_2(2^{\Delta 1} - 1)$. Therefore, an addition circuit 460 carries out a calculation of $(BVa - TVa) + \log_2(2^{\Delta 1} - 1) = QVf$ for obtaining the data QVf.

Referring to FIGS. 4 and 5, a subtraction circuit 420 is provided, instead of the subtraction circuit 42, for carrying out a calculation of $(BVa - TV1) - QVfa = \Delta 11$. Other process of calculation is the same as the process shown in FIG. 2 or 3.

Figure 6:
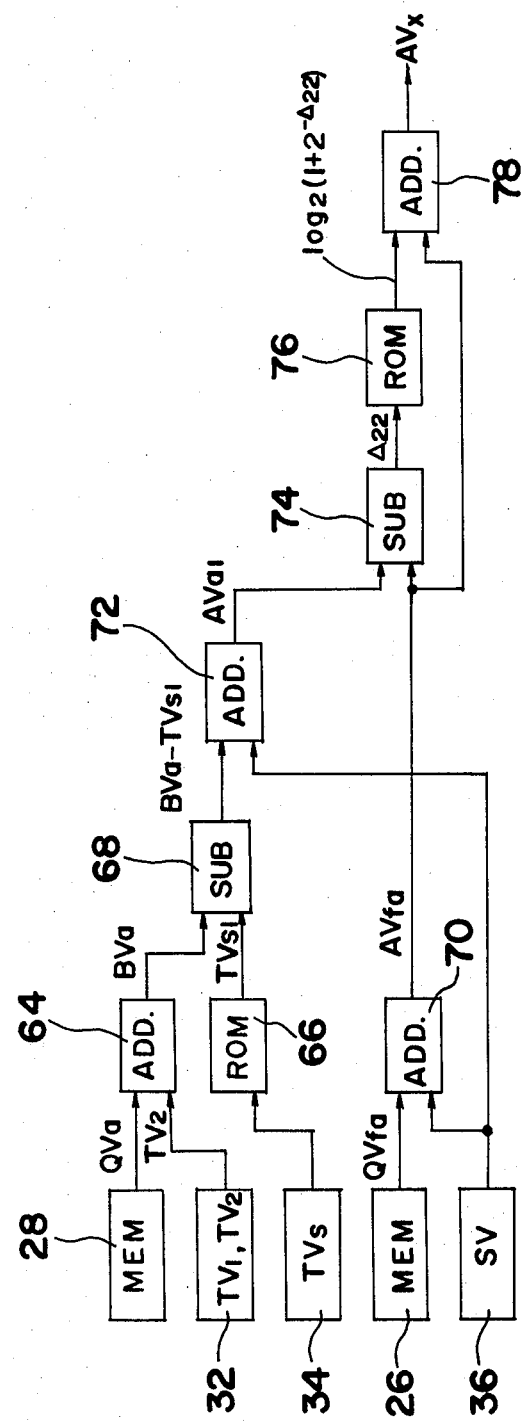

FIG. 6 shows a block diagram in accordance with another embodiment for obtaining the appropriate aperture value AVx. In an addition circuit 64, the signal indicative of the value QVa from the register 28 and the data indicative of the value TV2 from the circuit 32 are added with each other for producing a sum data corresponding to the value BVa. On the other hand, in a read only memory (ROM) 66, the data corresponding to the set exposure time value TVs is used for addressing the ROM 66 to produce a data corresponding to a value TVs1 as obtained from the equation ($\gamma$). By using the data from the circuits 64 and 66, the value TVs1 is subtracted from the value BVa in a subtraction circuit 68. The difference BVa-TVs1 is applied to an addition circuit 72 in which said difference BVa-TVs1 is added with the set value SV from the circuit 36. Accordingly, the circuit 72 produces a data indicative of the value AVa1 as expressed in the above equation (n). The data indicative of the value QVfa from the register 26 and the data indicative of the film sensitivity SV are added with each other in an addition circuit 70 for producing a data from the circuit 70 indicative of the value AVfa as expressed in the above equation (m). In a subtraction circuit 74, a calculation of $AVfa - AVa1 = \Delta 22$ is carried out for producing a data indicative of the calculated value $\Delta 22$ which is then applied to a ROM 76. The value $\Delta 22$ is used for adding the ROM 76 so that the ROM 76 produces a data corresponding to the value $\log_2(1 + 2^{-\Delta 22})$ which is then added in an addition circuit 78 with a value AVfa for obtaining the required value AVx.

Figure 7:
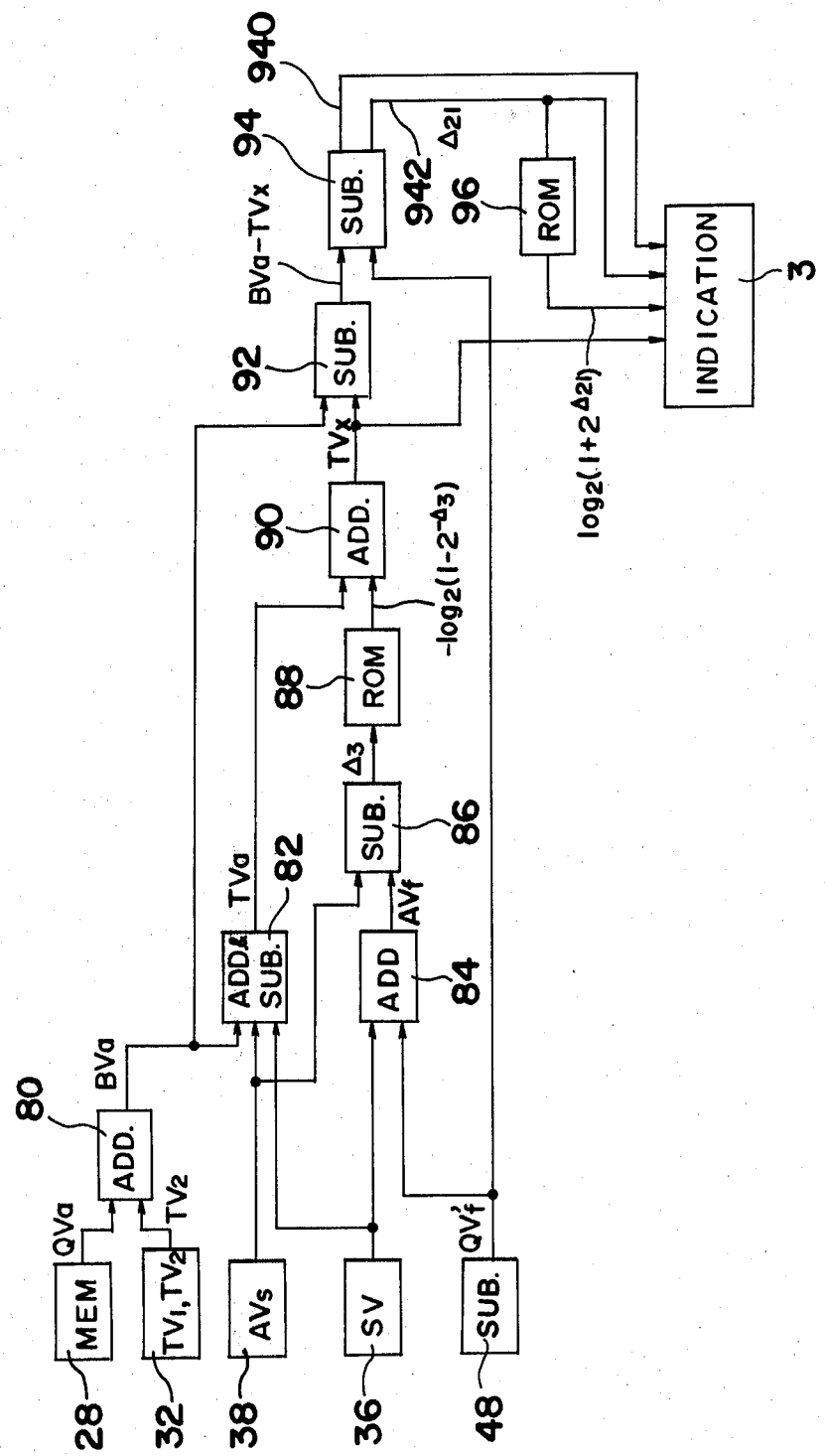
FIG. 7 is a block diagram of a photometer or light measuring device according to another embodiment of the present invention.

Referring to FIG. 7, a block diagram for obtaining an appropriate exposure time TVx and other information described above from a given information of aperture value AVs is shown. An addition circuit 80 is provided for adding the data indicative of the value QVa from the register 28 and the data indicative of the value TV2 from the circuit 32 and for producing a data indicative of brightness under the ambient light. The data indicative of the value BVa, set aperture value AVs and film sensitivity SV are used for calculation in an addition and subtraction circuit 82 which then produces a data indicative of an appropriate shutter speed $TVa = (\neq BVa + SV - AVs)$. The data indicative of the value QVf' produced from the subtraction circuit 48 and the data indicative of the film sensitivity SV are added with each other in the addition circuit 84 for obtaining an appropriate aperture value AVf under the flash light which is, in turn, applied to a subtraction circuit 86. In the subtraction circuit 86, the value AVf is subtracted from the value AVs for obtaining the value $\Delta 3$ as described in the above given equation (s). The value $\Delta 3$ is used for addressing the ROM 76 so that the ROM 76 produces a data corresponding to the value $-\log_2(1 - 2^{-\Delta 3})$. The data indicative of this value $-\log_2(1 - 2^{-\Delta 3})$ and the value TVa are added with each other in an addition circuit 90 in such a manner as expressed by the equation (u) for obtaining an appropriate shutter speed TVx which is applied to the indication circuit 3 for the display.

The data indicative of the value TVx and the value BVa are applied to a subtraction circuit 92 for carrying out the calculation of BVa-TVx. This calculated value in the circuit 92 and the value QVf' from the circuit 48 are applied to a subtraction circuit 94 for carrying out the calculation as given by the equation (c') for obtaining a data indicative of a value Δ21. The subtraction circuit 94 produces from a first terminal 940 thereof a signal in a binary form which is indicative of whether one of the values QVf' and BVa−TVx is larger than the other and, also produces from a second terminal 942 thereof a data indicative of an absolute value of the value Δ21. The terminals 940 and 942 are connected to the indication circuit 3 for the indication of the value Δ21. The terminal 942 is also connected to a ROM 96 for addressing the ROM 96 to produce a data corresponding to a value $\log_2(1+2^{\Delta 21})$ which is applied to the indication circuit 3 for the indication of the contrast between the object and the background or the ratio of the quantity of light reaching or reflected on the object between the photographs with and without the flash light.

The calculation as described above with reference to FIGS. 2 to 7 are proceeded in a predetermined sequence by the controlling signal obtained from a terminal 18 of the timing circuit 1. Since the terminal 18 may produce the calculation start signal at any moment and since the measured values QVfa and QVa are memorized in the registers 26 and 28, it is possible to repeat the calculation for different values of film sensitivity SV, aperture value AVs, shutter speed TVs and/or quantity of light from the flash light from the flash light Δf without any further light measuring operation therefor.

Figure 8:
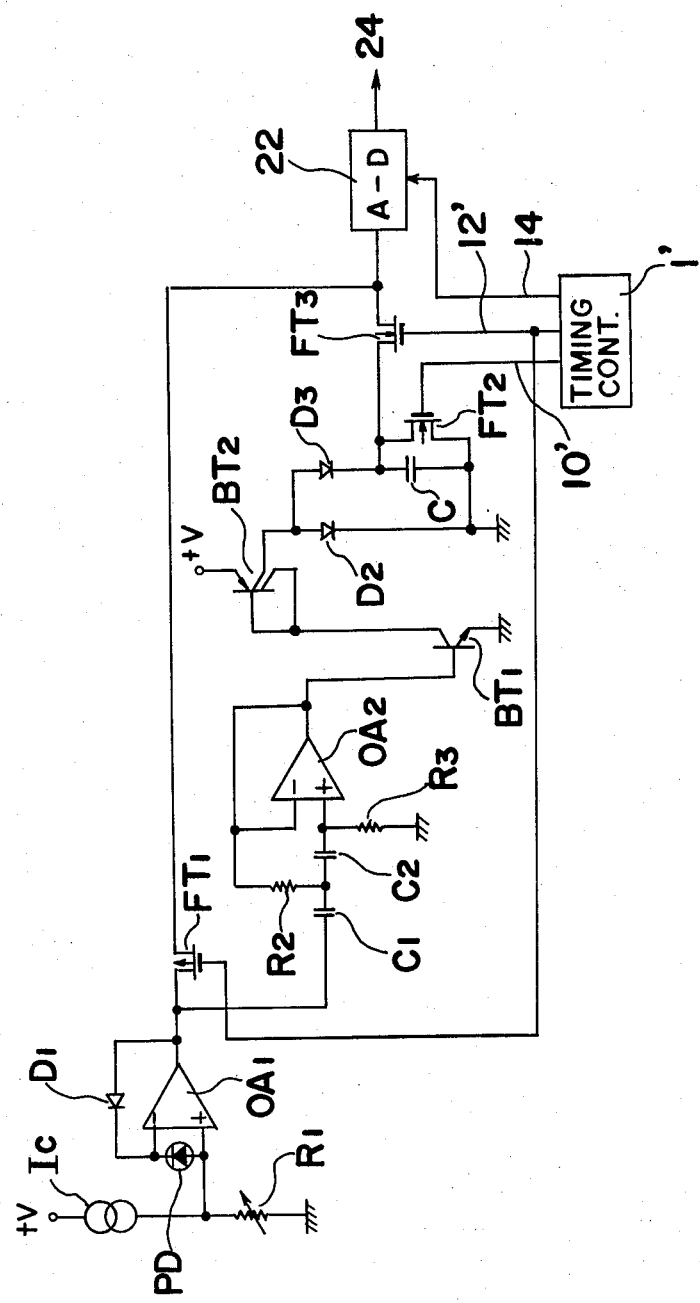
FIG. 8 is a circuit diagram showing the details of a light measuring circuit according to another embodiment of the present invention.

Referring to FIG. 8, another embodiment of a circuit for measuring the intensity of light BVa under the ambient light and for measuring the quantity of light QVf under the flash light only is shown. An operational amplifier QA1 has its non-inverting input connected to a junction between a constant current source Ic and an adjusting register R1 for adjusting the output level of the operational amplifier OA1. A reference character PD designates a photodiode for producing a signal indicative of the intensity of the incident light while a reference character D1 designates a diode for the logarithmic compression. Therefore, the operational amplifier OA1 produces an output signal indicative of output current from the photodiode PD which is logarithmically compressed and carried on a level determined by the adjusting register R1. The timing controller 1' produces a high level signal from outputs 10' and 12' thereof until the switch S shown in FIG. 2 is closed. Therefore, a P-channel FET (field effect transister) FT1 is not conducting while N-channel FETs FT2 and FT3 are conducting. Upon turning on of the switch S, the flash light is emitted and, at the same time, the terminal 10' produces a low level signal for bringing the N-channel FET FT2 in a non-conductive state. Furthermore, a high-pass filter constituted by capacitors C1 and C2, resisters R2 and R3 and operational amplifier OA2 produces a signal relative to the AC component of the output voltage from the operational amplifier OA1. The output signal from the operational amplifier 0A2 is applied to the base of a transistor BT1 for producing a logarithmically expanded current signal from the collector thereof. Such output current from the transistor BT1 is applied through the collector of a transistor BT2 to a logarithmically compressed signal integrator constituted of diodes D2 and D3, and capacitor C for charging the capacitor C with a voltage relative to the logarithmically compressed value of the total incoming current thereto. It is to be noted that the voltage across the capacitor C is in relation to the value QVf. In a strict sense, the voltage across capacitor C does not correspond to the value QVf. From the view point of practice, however, the voltage across the capacitor C can be approximated to a voltage which corresponds to the value QVf. The logarithmically compressed signal integrator is described in detaill in Japanese Patent Publication No. 28038/1975.

A predetermined period t1 (longer than the longest time for the flash light to emit light) after the switch S has been turned on, a terminal 14 of the timing controller 1 produces a timing signal to the A-D converter 22 for start converting the voltage carried in the capacitor C from analog to digital form. After a predetermined time enough long for the A-D conversion, a digital data indicative of the value QVf is transmitted through the demultiplexer 24 (FIG. 2) to the register 26.

Thereafter, the terminals 10' and 12' produce low level signals for bringing the N-channel FETs FT2 and FT3 in non-conductive states while conducting the P-channel FET FT1. Then, A-D converter 22 receives light measured signal from the operational amplifier OA1. Since, at this moment, the flash light is already lighted, only the ambient light is measured to produce an analog signal relative to the brightness of luminance BVa under the ambient light.

Upon receipt of successive signal from the terminal 14 of the timing controller, the A-D converter 22 converts the signal BVa into digital form and, in turn, the converted signal BVa is applied to the register 28. Thereafter, the calculation proceeds in a manner described above with reference to FIGS. 2 to 7 for obtaining photographic information such as, the appropriate aperture value for the ambient light accompanied by the flash light, the appropriate aperture value for the flash light only, the appropriate shutter speed, lighting contrast or the contrast between the object which is within the reach of the flash light and the background which is beyond the reach of flash light.

When the brightness of luminance BVa under the ambient light changes, the timing controller is so operated as to produce another timing signal from the terminal 14 for the actuation of A-D converter 22 and for the memorization of newly applied digital data indicative of the intensity of light BVa in the register 28. Therefore, the data memorized in the register 28 accordingly changes with the change in the ambient light. According to this embodiment, it is advantageous in that a less number of elements are used for the calculating circuit 4 shown in FIG. 2.

Figure 9:
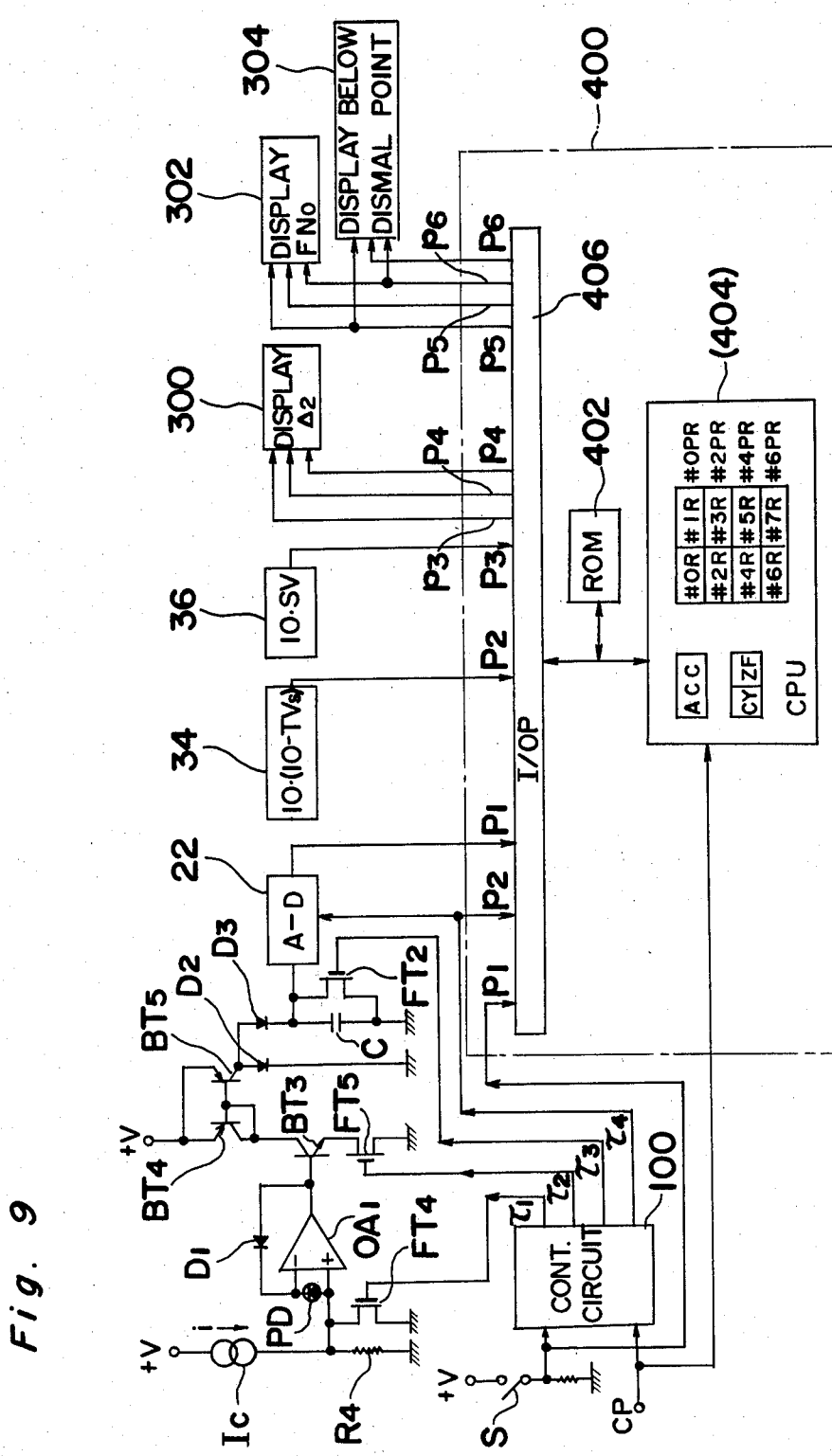
FIG. 9 is a block diagram of a photometer according to another embodiment of the present invention employing a micro-computer.

Referring to FIG. 9, a circuit for the photometer includes a light receiving element PD, which is provided at a window formed in a frame (not shown) of the photometer, for receiving light reaching or reflected on the object under the ambient light or flash light and for producing a signal indicative of the receive light. An operational amplifier OA1 which is connected to the light receiving element PD is coupled with a diode D1 for the logarithmic compression so that the output signal from the operational amplifier OA1 is in relation to the logarithmically compressed value of the input signal thereto from the photodiode PD. Non-inverting input of the operational amplifier OA1 is connected to a constant current source Ic, a resistor R4 and an field-effect transistor FT4 which do not conduct during the light measurement under only ambient light. The output signal from the operational amplifier OA1 is therefore in relation to the sum of the logarithmically compressed value of the signal produced from the photodiode PD and the voltage level defined by the constant current source Ic and the resistor R4 so that a collecter current of a transistor BT3 connected to the operational amplifier OA1 is substantially equal to an amplified current of the output current from the photodiode PD. On the other hand, when the flash light is present, the transistor FT4 conducts to connect the non-inverting input of the operational amplifier OA1 with the ground for disabling the function of resistor R4 since the intensity of flash light is sufficiently great and the function of R4 is rather harmful. It is also to be noted that the calculation process carried out in a calculation circuit as described later takes a suitable correcting operation to counterbalance the signals being compensated and the signals not compensated.

The transistor BT3 has its base connected to the output of the operational amplifier OA1 for producing logarithmically expanded signal from the collector thereof. The collector of the transistor BT3 is connected to the base and the collector of the transistor BT4 and also to the base of a transistor BT5. The collector of the transistor BT5 is connected to an integrating circuit which comprising diodes D2 and D3 and capacitor C for integrating logarithmically compressed signal. The capacitor in this integrating circuit is charged with logarithmically compressed voltage of the quantity of light received by the light receiving element PD.

A transistor FT2 is provided for discharging the capacitor C to reset the light measuring circuit while a transistor FT5 is provided for switching the transistor BT3 on and off. The A-D converter 22 is provided for converting the voltage across the capacitor C into digital data. The converted digital data is applied to a micro-computer described later.

The manually operable push button switch S turns on the photometer of light measuring device upon its first pushing operation and turns off the same upon its second pushing operation. The switch S is connected to a control circuit 100 which produces a start signal for starting the light measurement and other control signals such as a signal for actuating the flash light as the switch S is turned on. Other control signals from the control circuit 100 is described hereinbelow.

The control circuit 100 sequentially produces control signals at individual predetermined time intervals from the terminals $\tau 1$, $\tau 2$, $\tau 3$ and $\tau 4$, thereof. The control circuit 100, as shown in detail in FIG. 10, includes five counters CO1 to CO5 and five flip-flop circuits FF1 to FF5 in which the reset terminals thereof are connected to the switch S. The set outputs of the flip-flop circuit FF1 to FF5 are shown by reference characters Q1 to Q5. The clock input terminals CL of the counters CO1 to CO5 are connected to outputs of AND gates AN1 to AN5, respectively. The 1st input of the AND gates AN1 and AN5 are connected to clock pulse generator CP. The 2nd input of the AND gate AN1 is connected to the switch S while the second input of the AND gates AN2 to AN5 are connected to set output terminal of the previous flip-flop circuit. The 3rd input of the AND gates AN1 to AN5 are connected to reset output terminal of respective flip-flop circuits FF1 to FF5. Since each flip-flop circuit produces a set output when the corresponding counter has counted upto its maximum value, and the corresponding AND gate becomes off so that the corresponding counter stops counting, and since second counter counts one when the first counter has counted upto its maximum once, the output from the flip-flop circuits FF1 to FF5 produce signals at an individual time interval.

Figure 10:
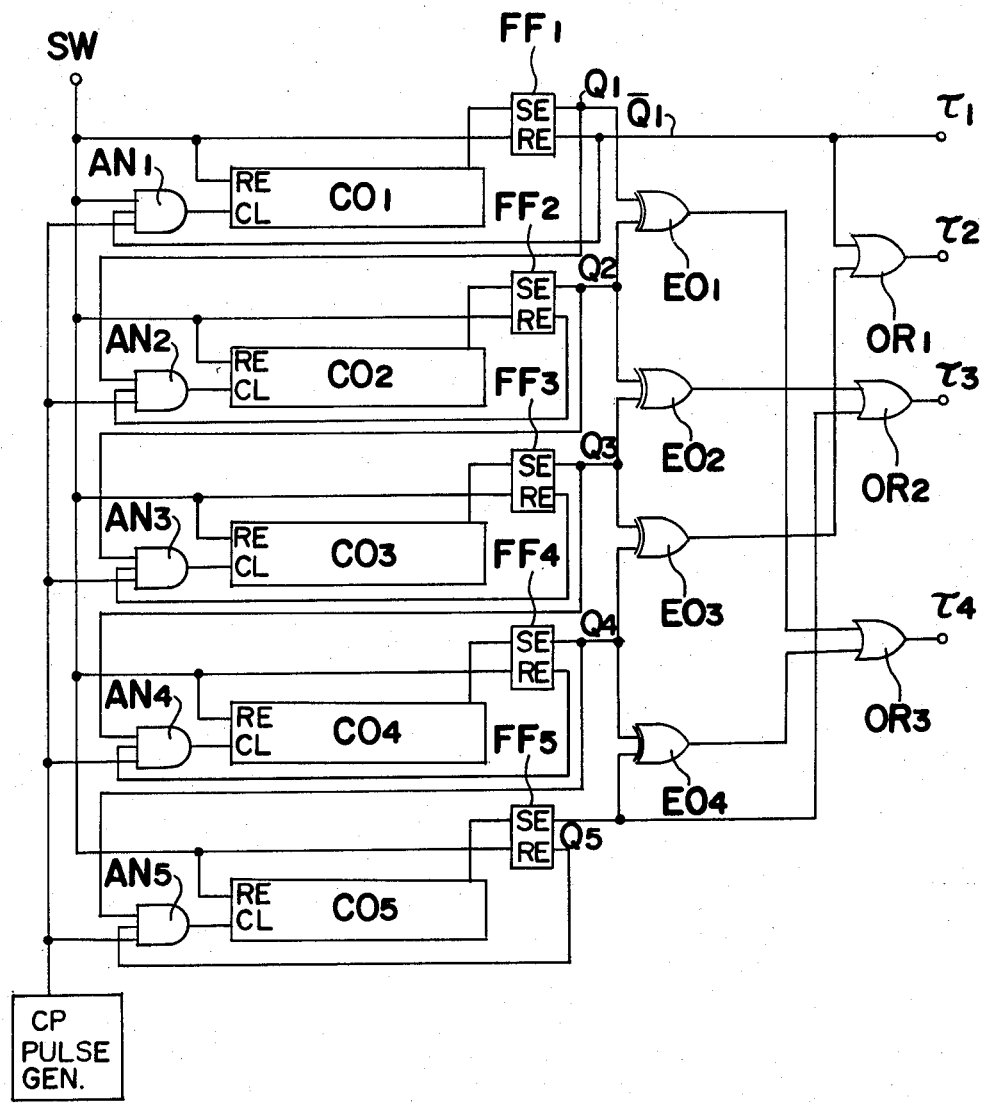
FIG. 10 is a circuit diagram showing the details of a block of control circuit shown in FIG. 9.
Figures 12, 12A:
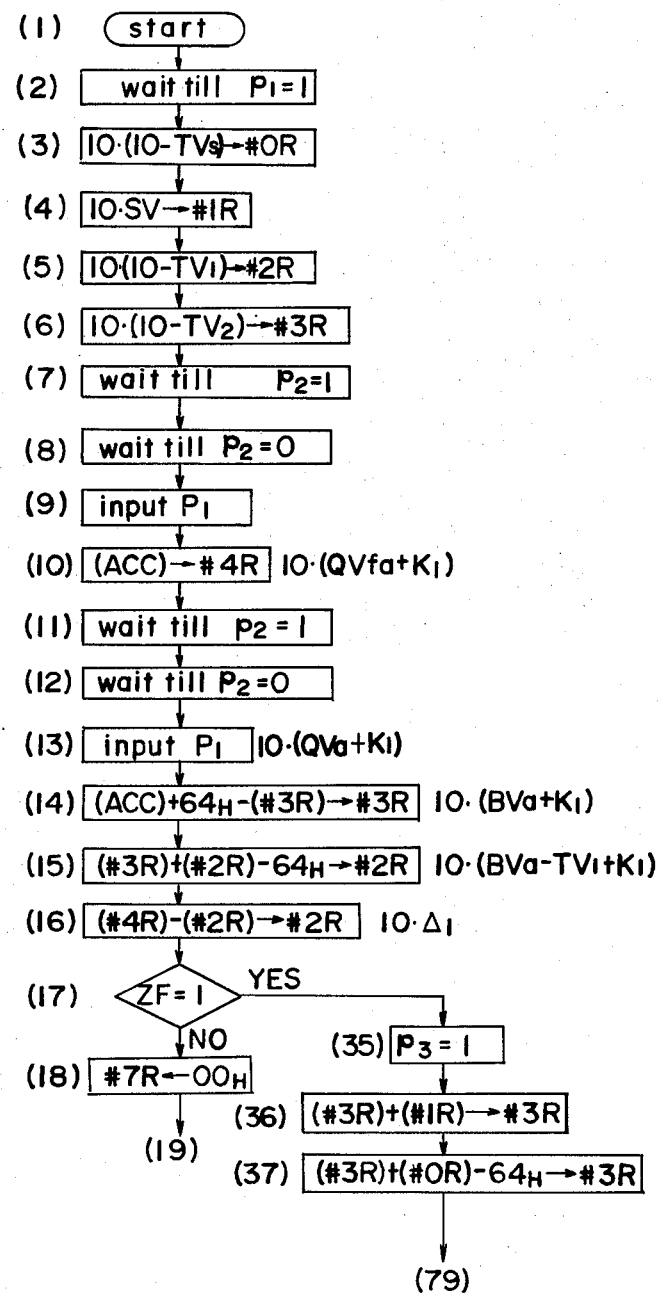
FIGS. 12a to 12e taken together as in FIG. 12 show a flow chart for carrying out the calculation according to the block diagram shown in FIG. 9.
Figure 12B:
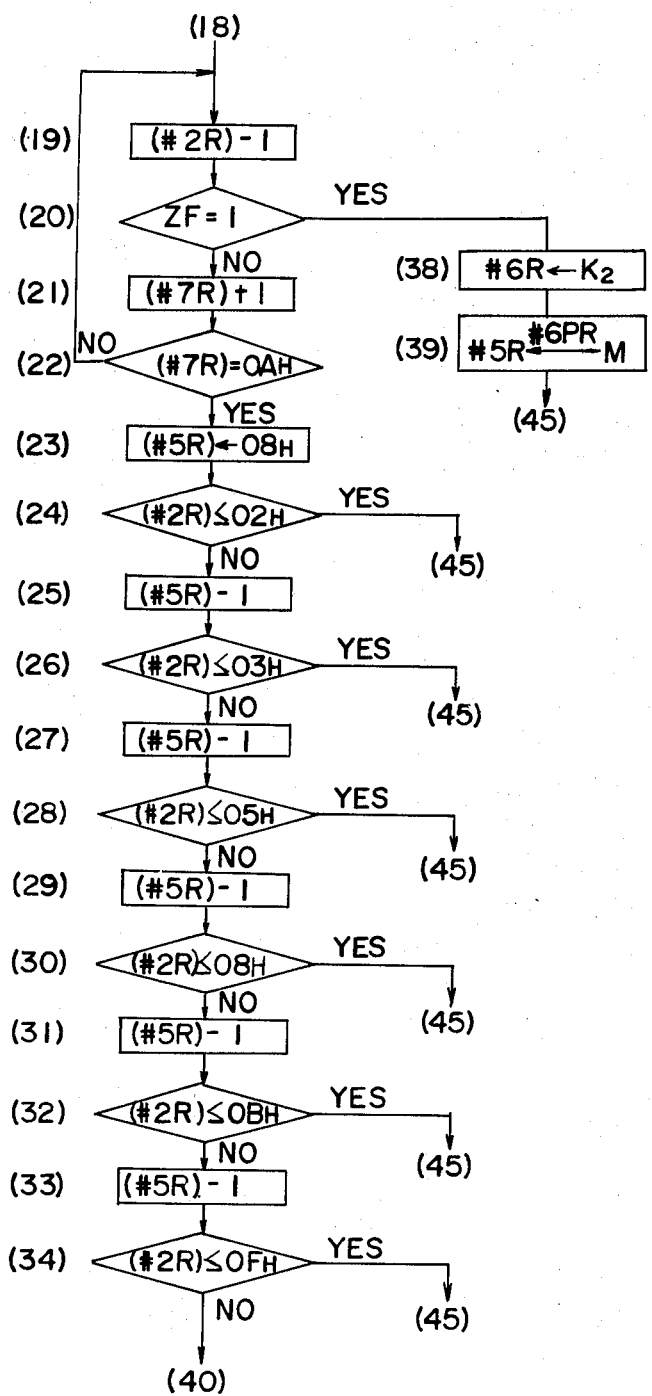
Figure 12C:
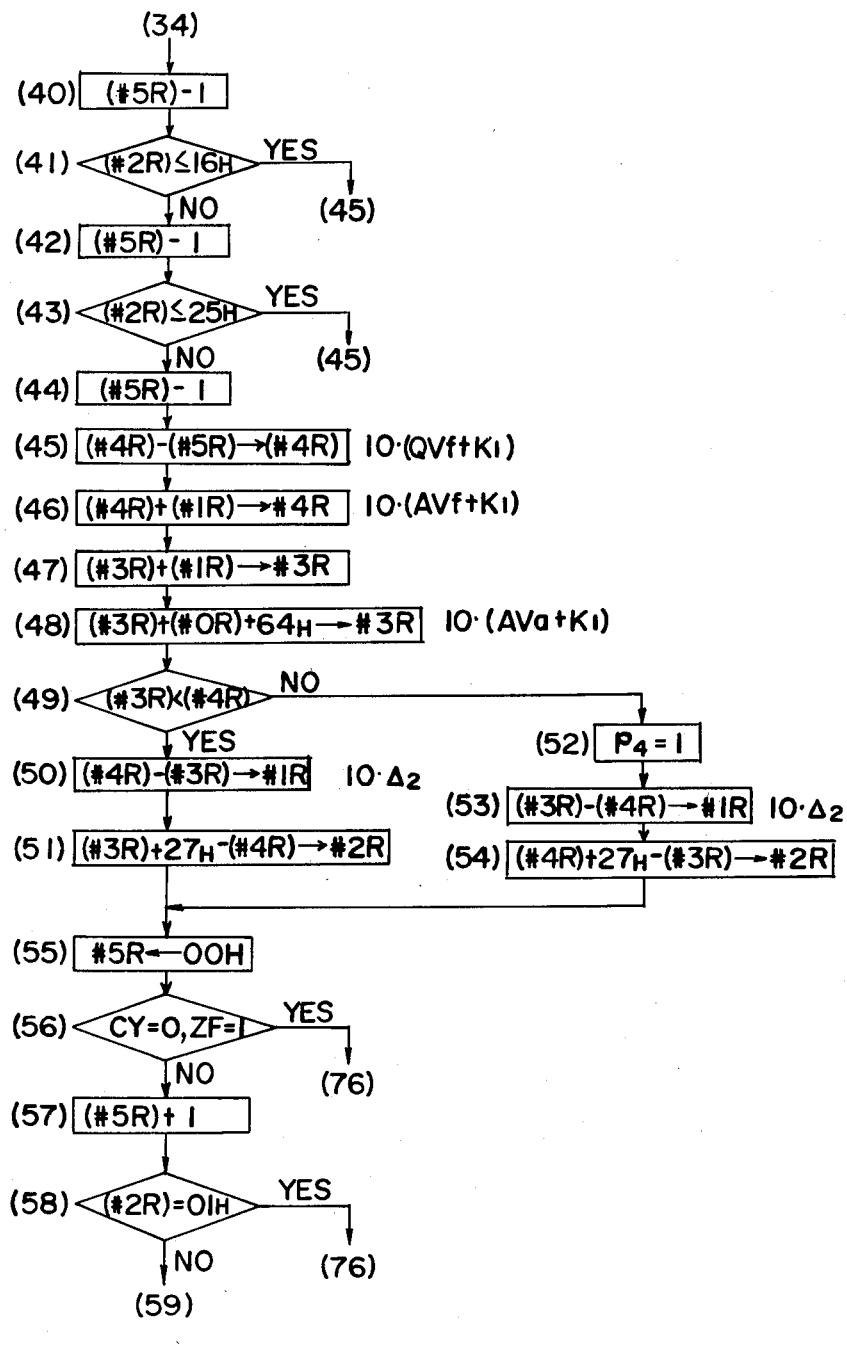
Figure 12D:
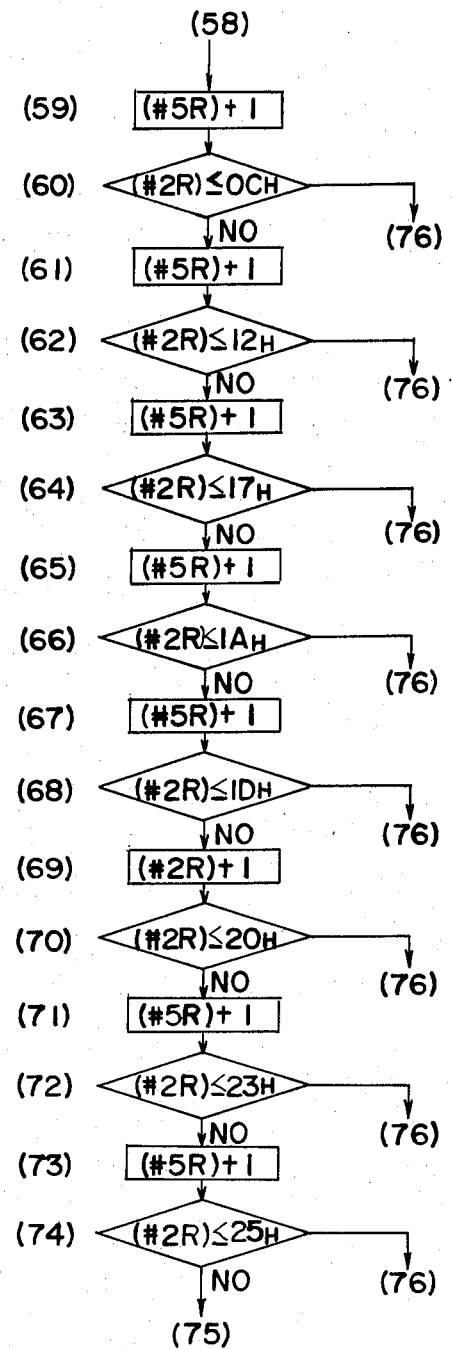
Figure 12E:
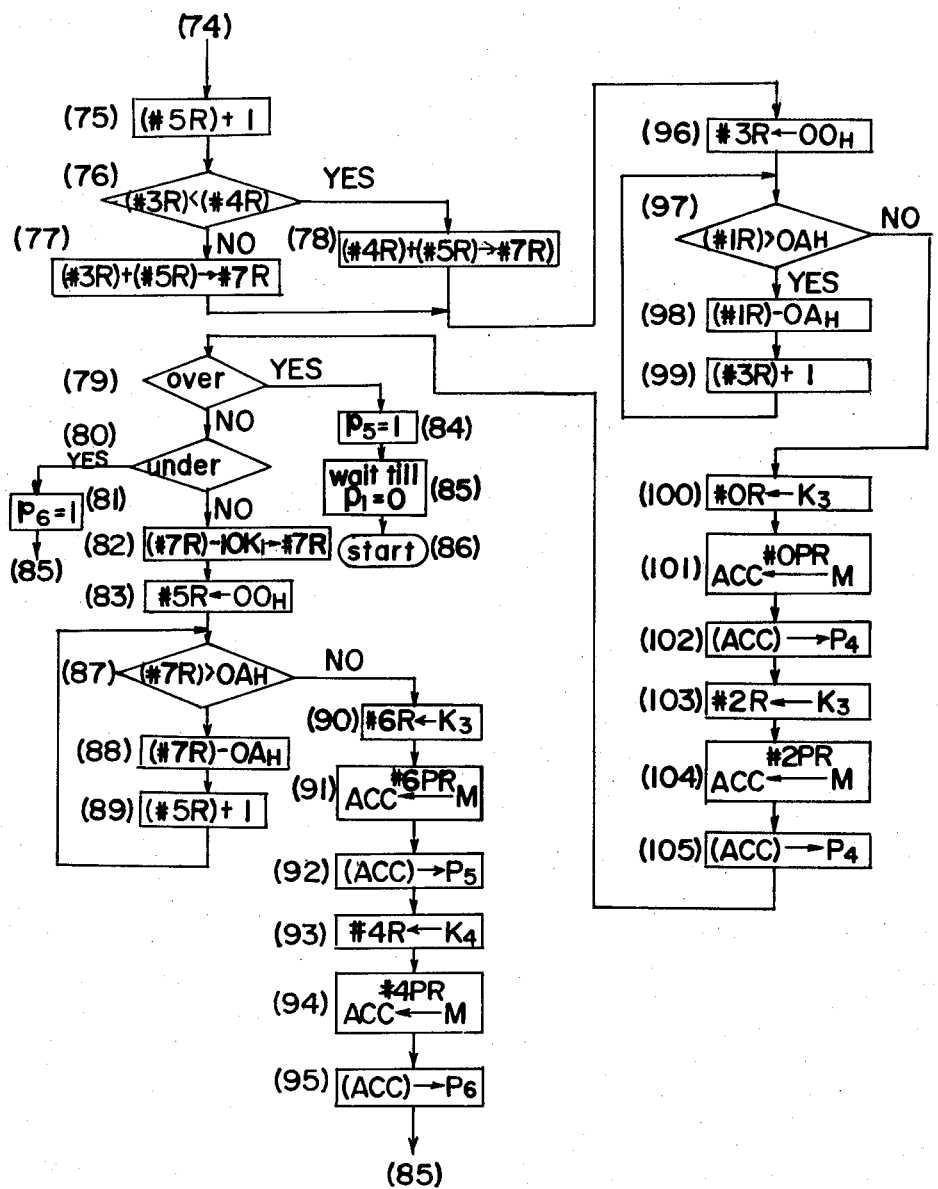

The set outputs of the flip-flop circuits FF1 to FF5 are connected to EXCLUSIVE OR gates EO1 to EO5, respectively and, in turn, to OR gates OR1 to OR3 in a manner shown in FIG. 10, so as to produce control signal from the output terminals $\tau 1$, $\tau 2$, $\tau 3$ and $\tau 4$.

Referring back to FIG. 9, a reference numeral 400 designates a micro-computer which includes CPU (central processor unit) 404, I/O (input and output) port 406 and a read only memory 402 for memorizing necessary information for carrying out the steps shown in a flow chart in FIGS. 12a to 12e and fixed data. The CPU includes an accumulator ACC constituted by 8-bit registers, registers #OR to #R7, carry flag CY and zero flag ZF and sections such as arithmetic logic section, program counter section, timing control section, etc. It is possible to connect the registers #1R and #OR in series to form a 16-bits register #0PR and, similarly, to form registers #2PR, #4PR and #6PR. Since the structure of the micro-computer is not directly involved in the present invention, the further description therefor is omitted for the sake of brevity.

A reference numeral 34 designates a shutter speed setting circuit for producing a digital signal indicative of a value 10·(10−Tvs) obtained from the set shutter speed in APEX value TVs, while a reference numeral 36 designates a film sensitivity setting circuit for producing a digital signal indicative of a value 10·SV obtained from the set film sensitivity in APEX value SV. The output signals from both of the circuits 34 and 36 are applied to the I/O port 406.

A reference numeral 300 designates an indication device for indicating a lighting contrast Δ2 in APEX value a reference numeral 302 designates an indication device for indicating an F number as obtained from an integer portion of appropriate aperture value expressed in APEX value and a reference numeral 304 designates an indication device for indicating a value below the decimal point of appropriate aperture value expressed in APEX value. The details of such indication devices 302 and 304 are disclosed in U.S. patent application Ser. No. 10,978 now U.S. Pat. No. 4,262,997 filed on Feb. 9, 1979 and assigned to the same assignee of the present invention. The operation of the photometer or light measuring device described above is described hereinbelow.

When the button switch is pushed to turn on the switch S as the photometer is directed to an object, the counters CO1 to CO5 and flip-flop FF1 to FF5 are reset to produce high output level from the output terminals $\tau 1$ and $\tau 2$ and low output level from the output terminals $\tau 3$ and $\tau 4$. The high level signal produced from terminals $\tau 1$ and $\tau 2$ brings the transistors FT4 and FT5 in conductive state and the low level signal produced from terminal $\tau 3$ brings the transistor FT2 in non-conductive state in readiness of light measuring. The turning-on of the switch S also actuates the flash light to emit light therefrom with the light intensity as shown by the curve Ps(t) in the graph of FIG. 1. This light from the flash light together with the ambient light Pa as received by the photodiode PD is converted into electrical signal which is, in turn, amplified in terms of logarithmic compression in the amplifier OA1. Thereafter, the signal is logarithmically expanded in the transistor BT3. Then, the signal is logarithmically compressed in the diodes D2 and D3 and is integrated in the capacitor C.

On the other hand, in the control circuit 100, the clock pulses are applied through the AND gate AN1 to the counter CO1 for counting a predetermined period of time sufficient for the light measuring circuit to measure the flash light. After a time interval I as shown in a time chart of FIG. 11, counter CO1 produces a counted signal to the flip-flop circuit FF1 to set the same. Thereupon, the output terminal $\tau 1$ is changed to a low level for bringing the transistors FT4 and FT5 in the non-conductive state and, at the same time, the terminal $\tau 4$ is turned to a high level for actuating the A-D converter so as to convert the voltage across the capacitor C from analog form to digital form. Since the voltage across the capacitor is indicative of logarithmically compressed value of the quantity of light measured under the ambient light with the flash light, the converted signal corresponds to the value $10 \cdot (QVfa+K1)$. This value $10 \cdot (QVfa+K1)$ is then applied to the micro-computer.

At the end of the time interval II shown in FIG. 11, that is, when the counter CO2 has counted a predetermined number of pulses to set the second flip-flop circuit FF2, a high level signal is produced from the terminal $\tau 3$. Then, in a time interval II as shown in FIG. 11, the transistor FT2 is turned on for discharging the capacitor C.

Thereafter, when the counter CO3 has counted a predetermined number of pulses, the third flip-flop circuit FF3 is set at the end of the time interval III shown in FIG. 11 for producing high level signal from the output terminal $\tau 2$ and, thus, the transistor FT5 is turned on for starting the light measurement under the ambient light only.

The signal indicative of the quantity of light under the ambient light is produced across the capacitor C in a similar manner as described above. Thereafter, upon completion of counting in the counter CO4, the flip-flop circuit FF4 is set for producing a high level output from the output terminal $\tau 4$. Thereupon, the charge in the capacitor C, that is, the voltage indicative of the logarithmically compressed quantity of light under the ambient light is converted in the converter 22 to a digital signal indicative of the value $10 \cdot (QVa+K1)$ which is, in turn, applied to the micro-computer 400.

In the micro-computer 400, the above described two values $10 \cdot (QVfa+K1)$ and $10 \cdot (QVa+K1)$ are calculated together with the set values $10 \cdot (10-TVs)$ and $10 \cdot SV$ from the circuits 34 and 36 in accordance with the program described later to obtain the lighting contrast $\Delta 2$ and the appropriate aperture value and to display such lighting contrast $\Delta 2$ and the appropriate aperture value AVx through the display devices 300, 302 and 304 described above. The pressing of the switch button for the second time turns off the photometer. The step of calculation carried in the micro-computer 400 is described hereinbelow with reference to the flow chart shown in FIGS. 12a to 12e.

After the electric power has been supplied from the source of electric power and upon turning on of the switch S, APEX values $10 \cdot (10-TVs)$, $10 \cdot SV$, $10 \cdot (10-TV1)$ and $10 \cdot (10-TV2)$ corresponding to set shutter speed, film sensitivity, first and second measuring times are memorized in the registers #0R, #1R, #2R and #3R, respectively. In the step 9, the first light measured value under the ambient light accompanied by the flash light as transmitted through the A-D converter 22 is taken into the accumulator ACC and is then memorized in the register #4R as a digital value $10 \cdot (QVfa+K1)$. The value K1 used here and in other places in the specification is for maintaining the contents of the registers to be positive.

The second light measured value under the ambient light only as transmitted through the A-D converter 22 is added with a value 64H(100) and is subtracted by the value $10 \cdot (10-TV2)$ as contained in the register #3R to obtain a value $10 \cdot (BVa+K1)$. The obtained value $10 \cdot (BVa+K1)$ is memorized in the register #3R in the step 14. In the step 15, the contents of the register #3R is added with the content $10 \cdot (10-TV1)$ of the register #2R and is then subtracted by the value 64H to obtain a value $10 \cdot (BVa-TV1+K1)$ which is memorized in the register #2R. Thereafter, in the step 16, the difference $10 \cdot \Delta 1$ between the contents of the registers #4R and #2R $$10 \cdot \Delta 1 = 10[QVfa-(BVa-TV1)]$$

is memorized in the register #2R.

Since the light measured value under the ambient light only is previously added with the voltage level defined by the constant source Ic and the resistor R4, the difference in the APEX value for the measuring times between the values TV1 and TV2 is larger by a predetermined degree than the APEX value as obtained by the actual time difference.

Furthermore, when $\Delta 1=0$, that is, when $BVa-TV1=QVfa$, $2^{QVfa}=2^{BVa-TV1}=2^{QVf}+2^{BVa-TV1}$ wherein $2^{QVf}=0$. Therefore, it is understood that the light from the flash light does not effect on the exposure. Therefore, in this case, the state of the zero flag is discriminated in the step 17. If the zero flag ZF=1, a high level signal "1" is produced from a terminal p3 of the I/O port 406 and it is so indicated by the indication device 300. Thereafter, a calculation $BVa+SV-TVs=AVx$ is carried out and the procedure is advanced to the step 79 for displaying an appropriate aperture value and returned to "start".

When $10 \cdot \Delta 1 \neq 0$, a value $\log_2(1-2^{-\Delta 1})$ is obtained by the use of Table 1. When $01H<10 \cdot \Delta 1 <0BH$, every step change in the value $10 \cdot \Delta 1$ is equal to a change $-10 \cdot \log_2(1-2^{-\Delta 1})$. Therefore, by subtracting one by one from the contents of the register #2R, the contents of the register #2R can be obtained by the number of subtractions carried out. More particularly, in the step 19, the contents of the register #7R increases one by one as the content of the register #2R is subtracted by one by one. When the contents of the register #2R reaches 00H, a predetermined value K2 is set up in the register #6R, while, in the step 39, a section in the read only memory 24 as addressed by the contents of the 16-bit register #6PR, that is, $\Delta 1+K2$, is read out from the Table 1 within a section 27H to 09H for memorizing the read-out value in the register #5R. Then, the procedure is jumped to the step 45 in which the register #5R is now carrying a value $-10 \cdot \log_2(1-2^{-\Delta 1})$. When the value $\Delta 1$ is larger than 0CH, a value 08H is set up in the register #5R, while the contents of the register #2R is discriminated whether it is smaller than 02H or not. When it is smaller than 02H, $10 \cdot \Delta 1 = 0CH \sim 0DH$, and thus, it is determined that $-10 \cdot \log_2(1+2^{-\Delta 1})=08H$. Therefore, in the step 45, the register #5R carries a value $-10 \cdot \log_2(1-2^{-\Delta 1})$. Then, in a similar manner, the procedure repeats the examination of the contents of register #2R and the sequential subtraction of "1" from the contents of register #5R. When the contents of register #2R is detected, the procedure jumps to step 45. At this time, the contents of register #5R corresponds to that of register #2R.

In the following next steps 45 to 48, calculations of $QVfa + \log_2(1-2^{-\Delta 1})$, $QVf+SV=AVf$, and $BVa+SV-TV=AVa$ are carried out to set value $10 \cdot (AVa+K1)$ in the register #3R. Thereafter, in the step 49, the values in the registers #3R and #4R are compared with each other to discriminate which one is larger than the other. When $(\#3R)<(\#4R)$, the value in the register #3R is subtracted from the value in the register #4R in the step 50 for producing the difference $10 \cdot \Delta 2$ which substantially indicates the difference between the photographs with and without the flash light. The difference $10 \cdot \Delta 2$ is then memorized in the register #1R. Thereafter, in the step 51, a calculation of $(\#3R)+27H-(\#4R)$ is carried out and the answer thereto is memorized in the register #2R. It is to be noted here that the reason for adding the value 27H in the calculation in the step 51 is to prevent the answer from becoming a negative value. In other words, as apparent from Table 2, when $AVa-AVf \leq 3.9$, $\log_2(1+2^{\Delta 2})$ will be 0, while there is no possibility of $AVa - AVf \geq 0$.

On the other hand, when it is descriminated that $(\#3R) \geq (\#4R)$ in the step 49, the value $\Delta 2$ will become a negative value so that the terminal p4 is provided with a high level signal for the indication of such fact. Thereafter, calculations of $(\#3R)-(\#4R)$ and $(\#4R)+27H-(\#3R)$ are carried out while the answers thereto are memorized in the registers #1R and #2R, respectively.

Thereafter, the register #5R is memorized with 00H and it is increased one by one as the contents of the register #2R is examined in accordance with Table 2 to find a region where the value of the register #2R belongs to. In the step 76, the register #5R carries a value $10 \cdot \log_2(1+2^{\Delta 2})$. Then, the contents of the registers #3R and #4R are compared with each other to find which one is larger than the other for adding the value carried in the register #5R to the one which is discriminated as the larger one. In this case, the sum will be the appropriate aperture value $10 \cdot (AVx+K1)$ which is in turn memorized in the register #7R.

Next, the contents of the register #1R, carrying the value corresponding to the lighting contrast, is divided by 10 to obtain the quotient and the remainder. In other words, the value $10 \cdot \Delta 1$ is divided by 10 and the answer $\Delta 1$ is separated into numbers above and below the decimal point. Such separated numbers are decoded in the memory 24 and are applied to the terminal P4 for the indication through the display device 300. Thereafter, the contents of the register #7R is discriminated whether it is within the range for the display or not. When it is above the range for the display, a high level signal is produced from the terminal p5 while, when it is below the range of display, a high level signal is produced from the terminal p6 for the indication through the display devices 302 and 304, respectively. Then, the contents of the register #7R carrying the aperture value is separated into numbers above and below the decimal point, in which the number below the decimal point is directly displayed in the form of APEX value through the display device 304 while the number above the decimal point is converted into F number by the use of the read only memory 402 for the indication through the display device 302. Thereafter, the switch S is opened for returning back to "start".

Although the embodiment described above is so arranged as to display the values corresponding to the initially set values of shutter speed TV and film sensitivity SV, the measured values $10 \cdot (BVa+K1)$ and $10 \cdot (QVf+K1)$ as used up to the step 85 can be shifted to the registers #3R and #4R upon completion of one cycle for the display and when the switch S is maintained on for a predetermined time interval thereafter. In this case, the setting of new values $10 \cdot (10-TVs)$ and 10-SV to the registers #OR and #1R and another cycle of calculation will provide a new information without the procedure for the light measurement.

Furthermore, according to the embodiment described above, the control circuit 100 for producing a timing signal to the A-D converter and others can be replaced by the micro-computer which produces a similar type of timing signal. Moreover, the micro-computer for carrying out the various calculations can be replaced by a number of calculation circuits each performing an individual calculation.

Figure 13:
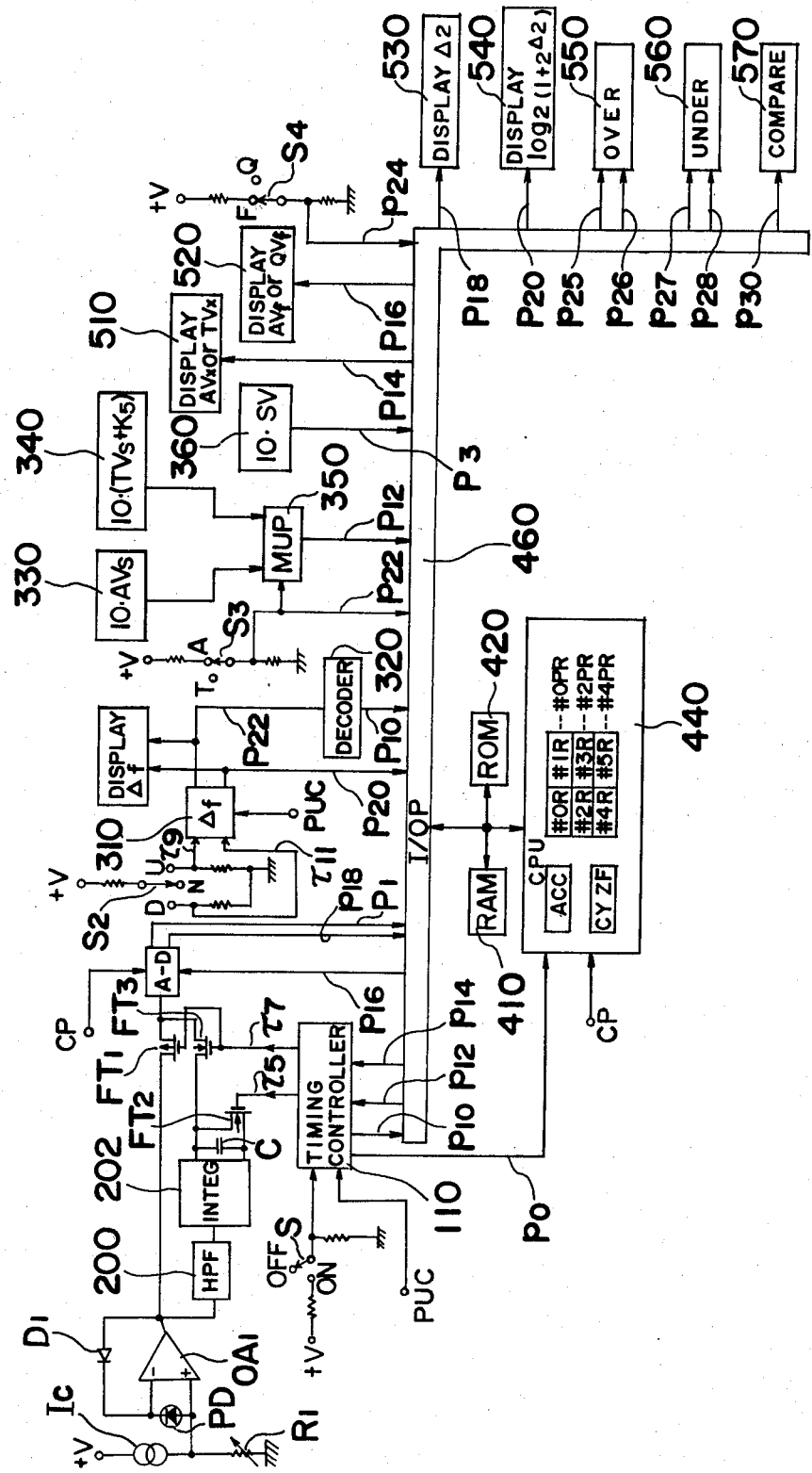
FIG. 13 is a block diagram of a photometer according to a further embodiment of the present invention.

Referring to FIG. 13, a circuit diagram shown therein is another embodiment of the photometer according to the present invention. The circuit comprises the constant current source Ic, adjusting resistor R1, light receiving element or photodiode PD, logarithmic compression diode D1 and operational amplifier OA1. A reference numeral 200 designates a high pass filter for allowing an AC signal above a predetermined frequency to pass therethrough. A reference numeral 202 designates an integrating circuit including a capacitor C for integrating the filtered signal which is logarithmically compressed. The detail of the integrating circuit is shown in FIG. 8. The switch S operates in association with a switch button (not shown) for actuating the photometer upon first pushing operation and for disabling the same upon second pushing operation. A reference character PUC designates a terminal which produces a high level signal for a predetermined time interval after the electric power has been supplied from the source of electric power (not shown). A reference numeral 110 designates a timing control circuit which is described in detail hereinbelow with reference to FIG. 14.

Figure 14:
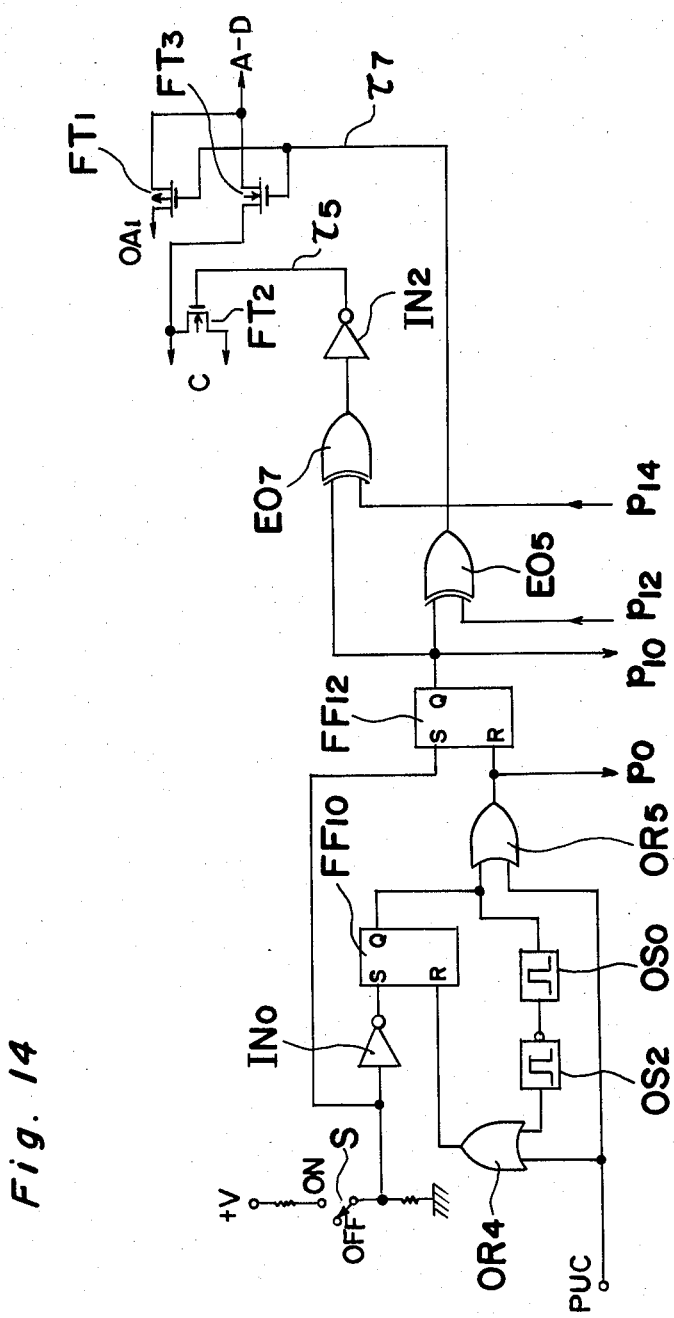
FIG. 14 is a circuit diagram showing the details of a block of timing controller shown in FIG. 13.

Referring to FIG. 14, subsequent to the supply of the electric power from the power source, a high level signal is applied for a predetermined time interval to the terminal PUC. This high level signal is applied through OR gates OR4 and OR5 to flip-flop circuits FF10 and FF12, respectively, for resetting the same and, at the same time, the high level signal produced from the OR gate OR5 is applied through the terminal p0 to a microcomputer (FIG. 13). At this moment, the terminals p10 and p12 are maintained at low level, so that EXCLUSIVE OR gates E05 and E07 produce low level signal from the outputs thereof. Accordingly, the transistors FT1 and FT2 are turned on while the transistor FT3 is turned off. Thereafter, upon turning the switch on, the flip-flop circuit FF12 is set to produce a high level signal from the output terminal p10 for actuating the EXCLUSIVE OR gates EO5 and EO7 to produce high level signal. Therefore, the transistors FT1 and FT2 are turned off while the transistor FT3 is turned on. Since the flip-flop circuits FF10 and FF12 are synchronized with the step-up of the signal, the flip-flop circuit FF10 is maintained in the reset state. After a predetermined time interval from the pushing of the light measuring button, the terminal p12 is provided with a high level signal for turning the output τ7 of the EXCLUSIVE OR gates EO5 to low for turning the transistor FT1 on and turning the transistor FT3 off. When the light measuring button is again pushed, the switch S is turned off and thus the flip-flop circuit FF10 is set. The step up of this signal is applied through the OR gate OR5 to the reset terminal of the flip-flop circuit FF12 for resetting the same. At the same time, the step-up of this signal is applied through the terminal p0 to the micro-computer for resetting the same. Thereupon, the terminals p12 and p14 are turned to low level signal for producing high level signal at the terminal τ5 and low level signal at the terminal τ7. Therefore, the transistors FT2 and FT1 are turned on while the transistor FT3 is turned off. Moreover, by the step-up of high level signal from the terminal Q of the flip-flop circuit FF10, a one-shot multi-vibrator circuit OSo produces a high level signal for a predetermined period of time and the one-shot multi-vibrator circuit OS2 produces a high level signal when the high level signal of the one-shot multi-vibrator circuit OS2 changes to low level for applying reset signal through the OR gate OR4 to the flip-flop circuit FF10. Therefore, all the circuits are reset to the same state as the state established upon application of the electric power from the source of electric power in readiness for the next operation.

Referring back to FIG. 13, a switch S2 operates in association with a sliding member (not shown) for selectively changing the indication of power or guide number of the flash light. For example, when the sliding member is pushed once to the position "UP", a signal output circuit 310 produces a signal indicative of increase in quantity of light by 1 EV (EV is a unit for the number expressed by the APEX system.) for the flash light. On the other hand, when the sliding member is pushed once to the position "DOWN", the signal output circuit 310 produces a signal indicative of decrease of quantity of light by 1EV for the flash light. The detail of the operation is described hereinbelow with reference to FIG. 15.

Figure 15:
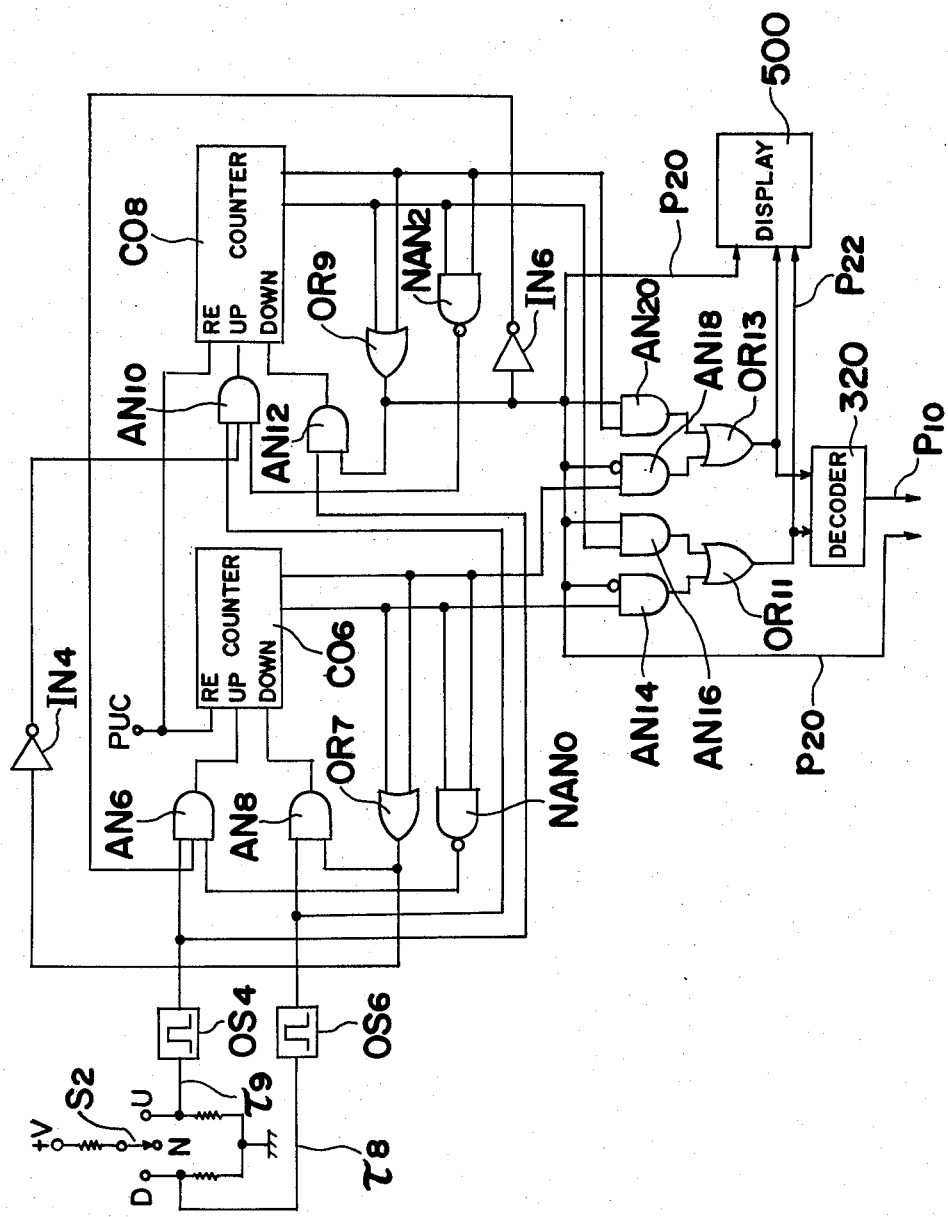
FIG. 15 is a circuit diagram showing the details of a block of output circuit 310 shown in FIG. 13.
Figure 16B:
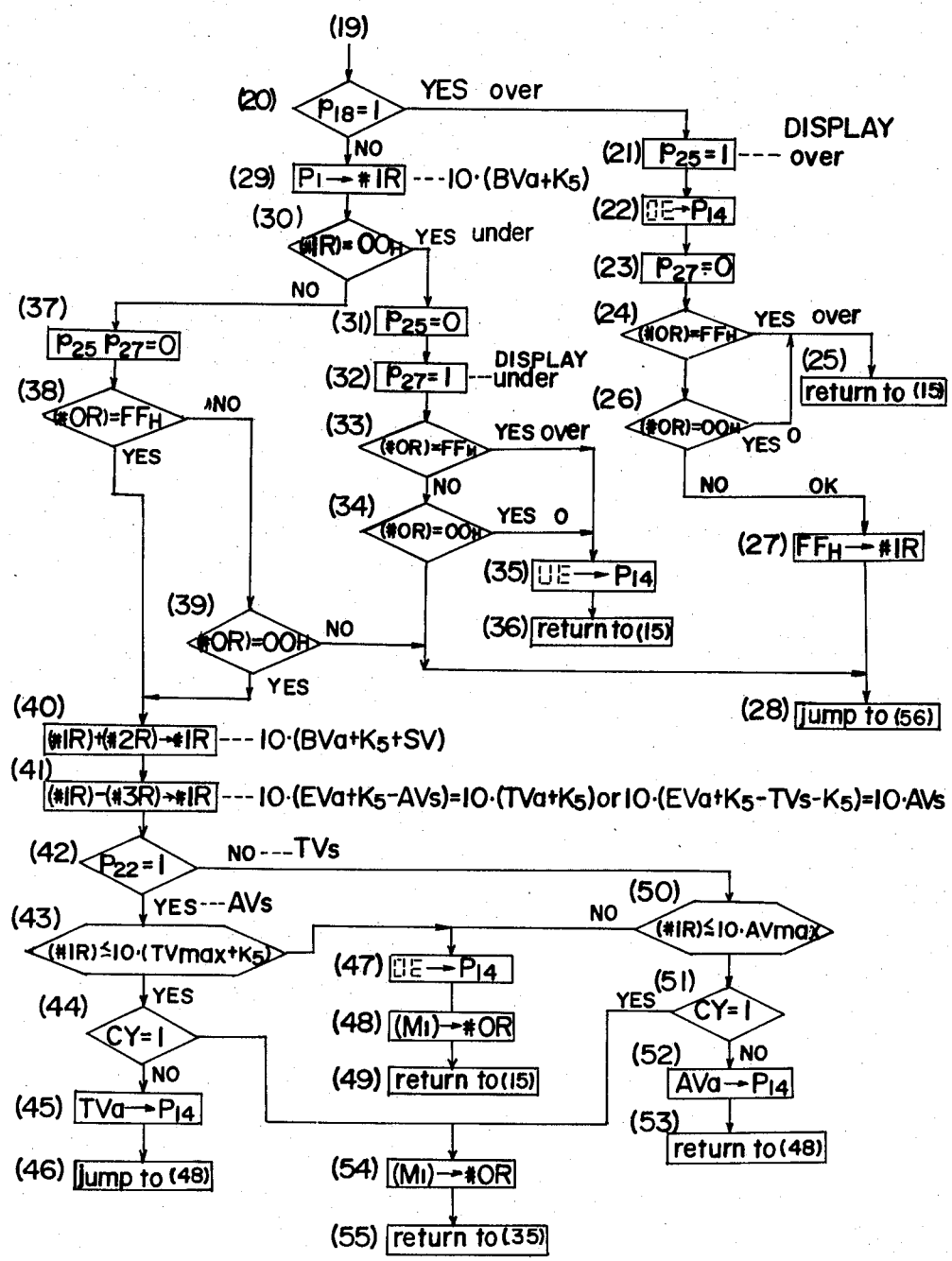
Figure 16C:
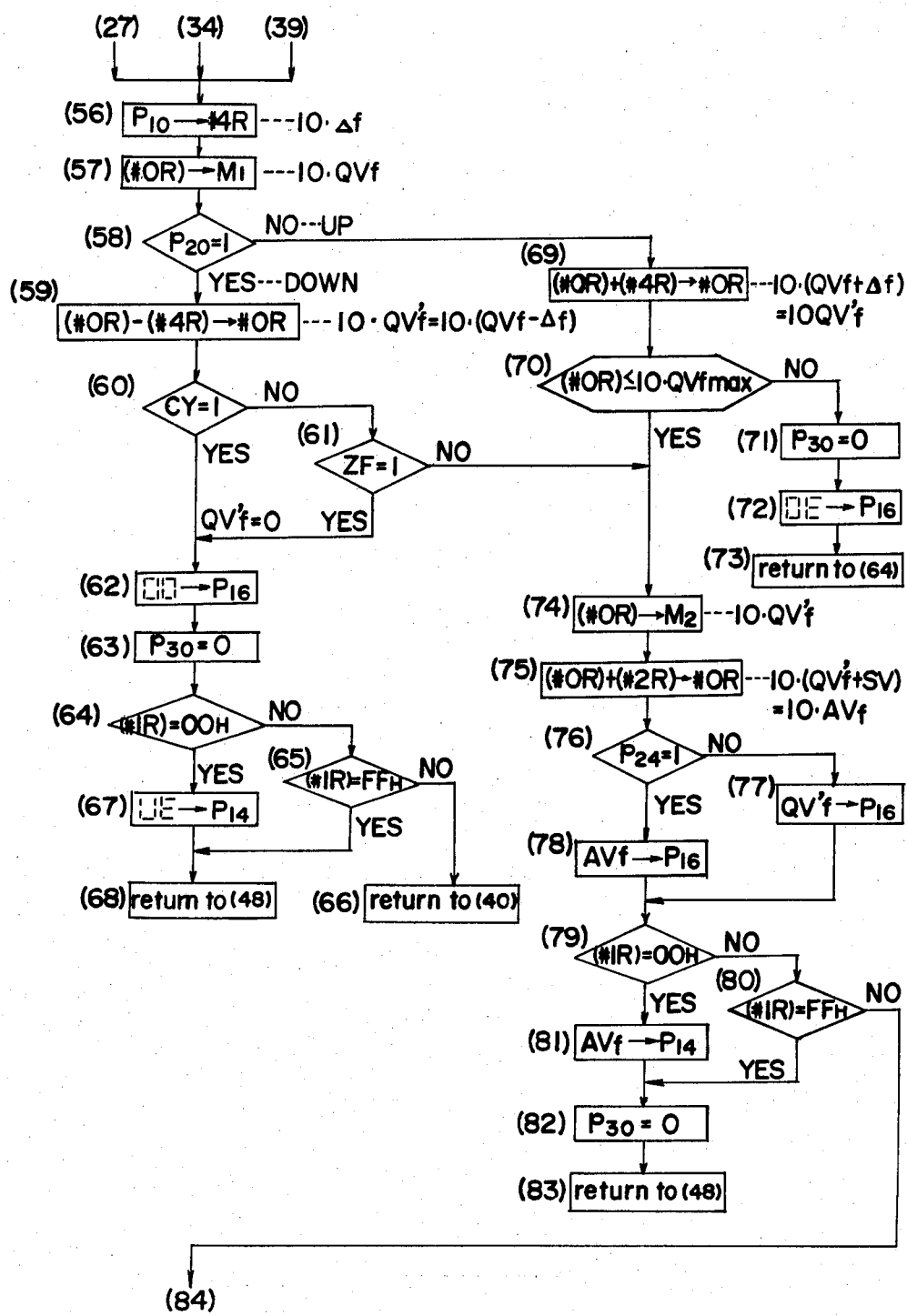
Figure 16D:
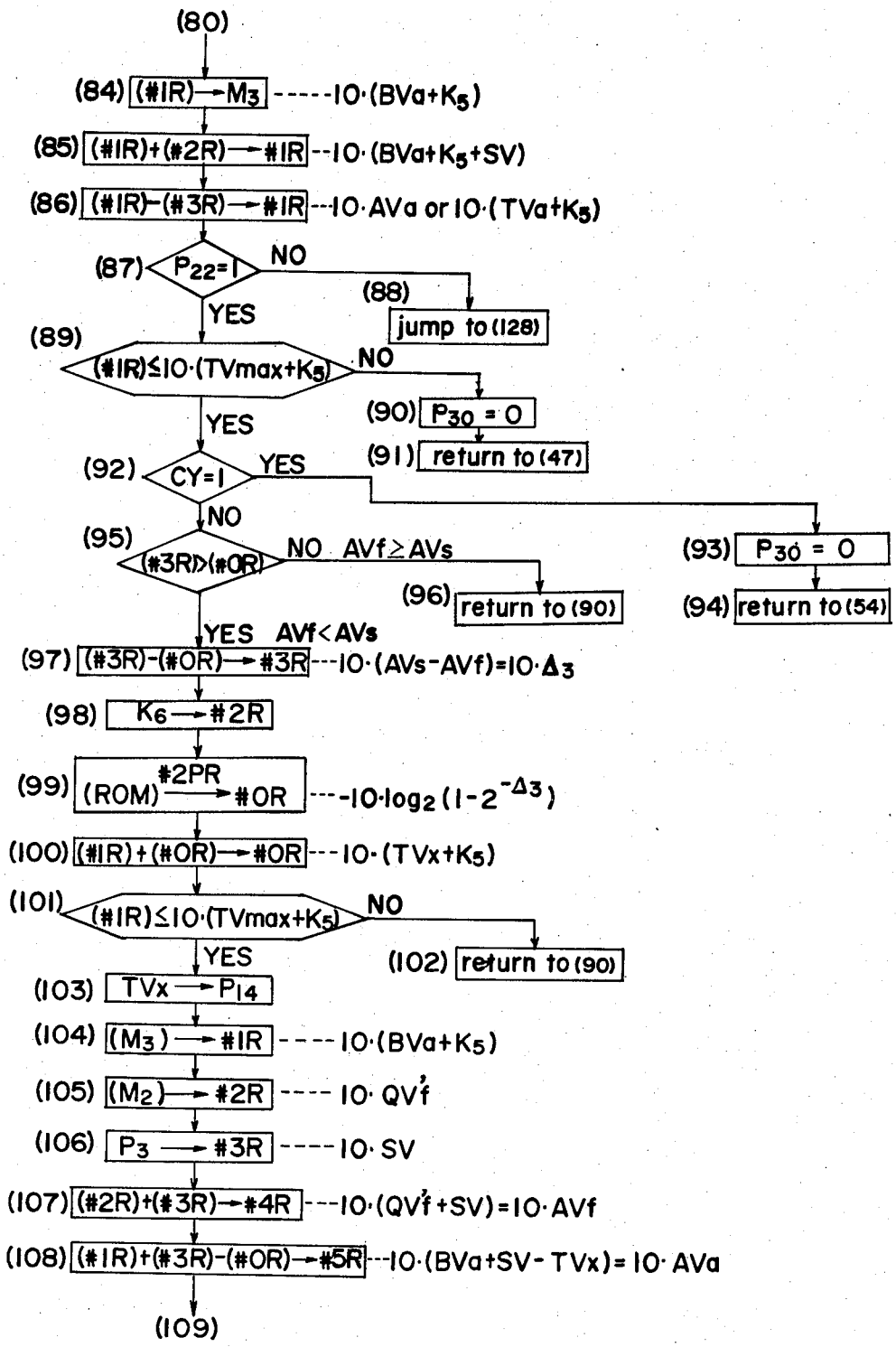
Figure 16E:
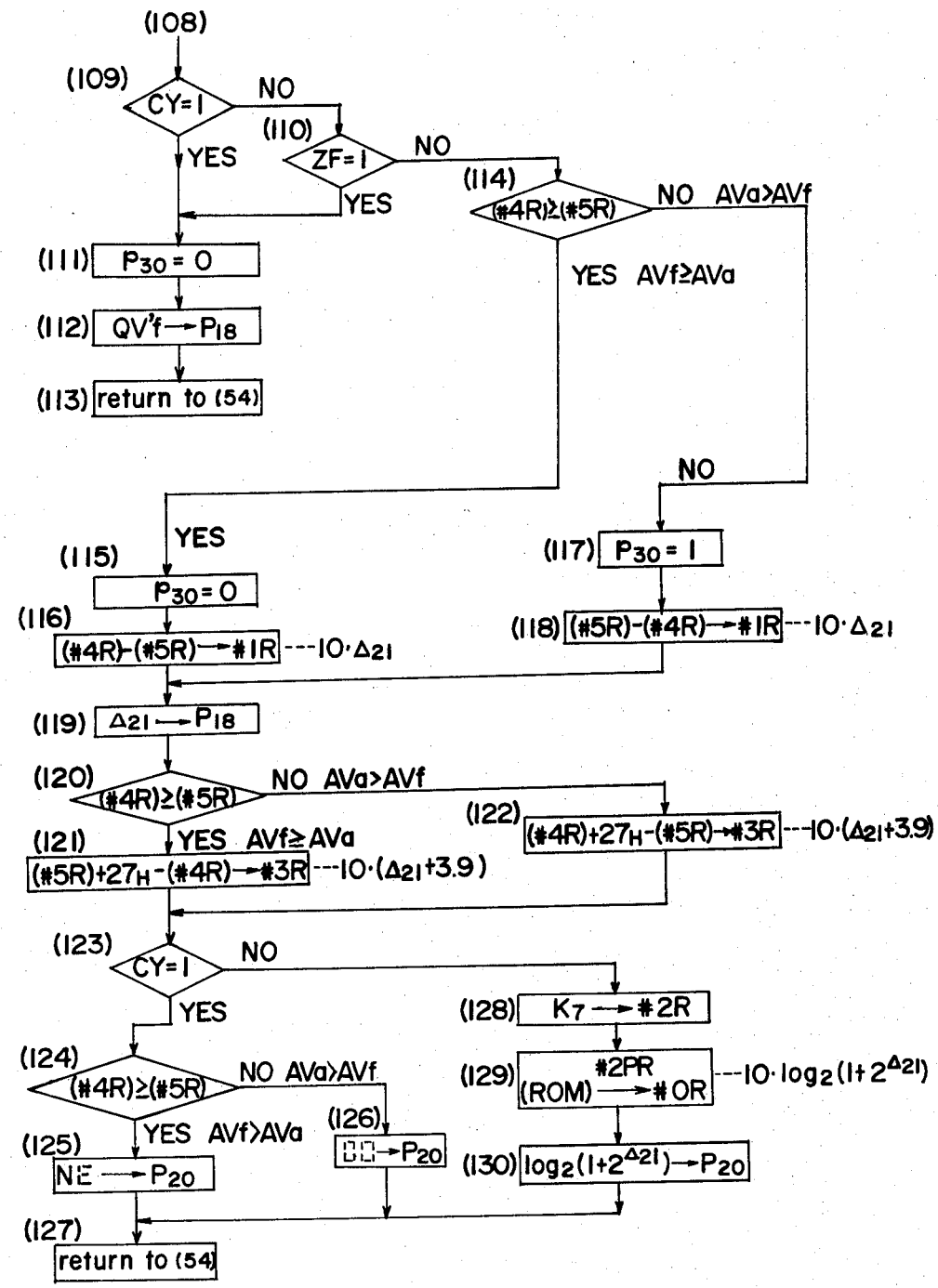
Figure 16F:
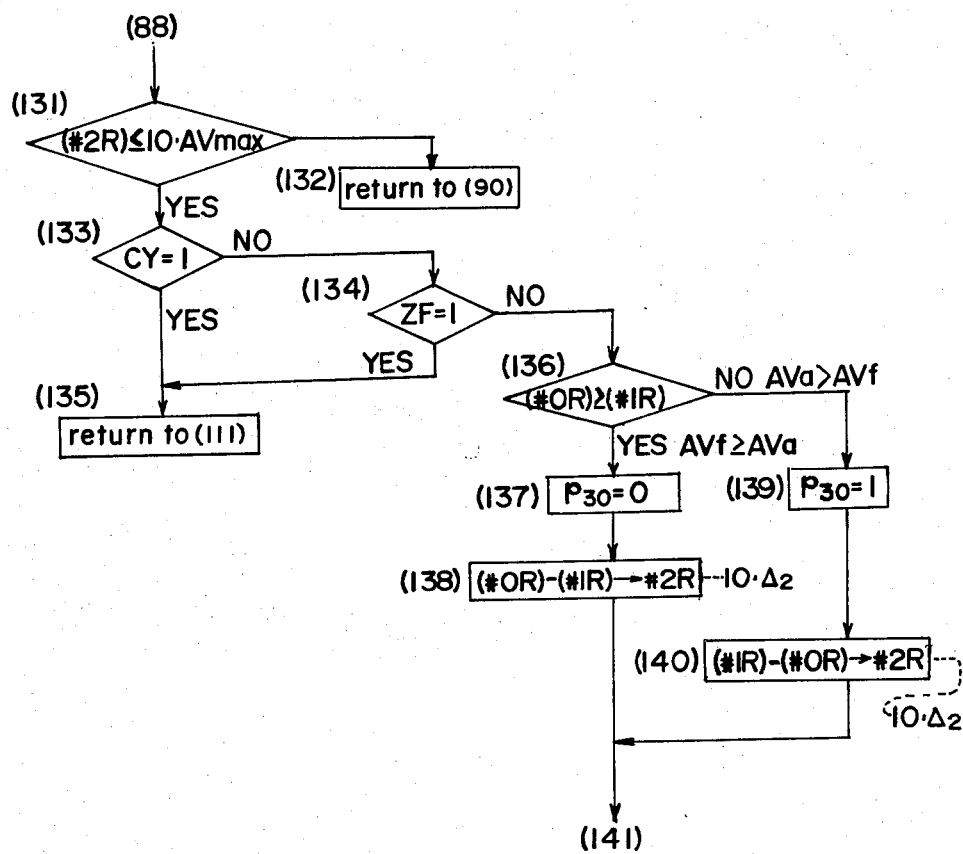
Figure 16G:
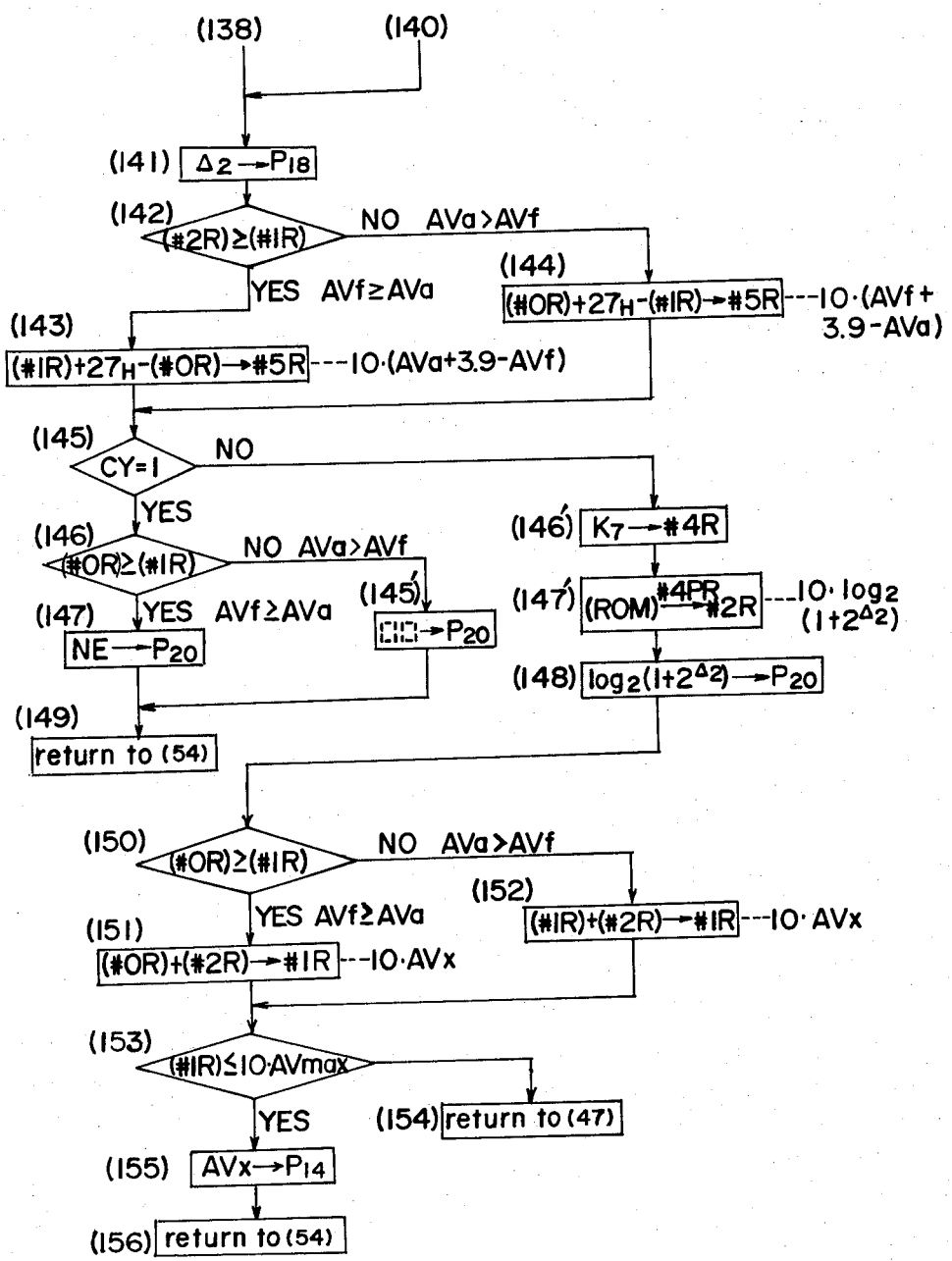

Referring to FIG. 15, upon supply of the electric power, up-down counters CO6 and CO8 are reset by the signal obtained from the PUC terminal. Thereafter, upon moving the sliding switch to the "UP" position, the movable arm of the switch S2 is held in contact with a terminal "U" for producing one clock pulse from one-shot multi-vibrator OS4. At this moment, since the contents of the up-down counters CO6 and CO8 are maintained "00" while the outputs of the OR gates OR7 and OR9 are producing low level signals and outputs of NAND gates NAN0 and NAN2 are producing high level signals, the clock pulse produced from the one-shot multi-vibrator OS4 is applied through an AND gate AN6 to the UP terminal of the counter CO6 for producing counted signal of "01". In this case, since one input of the AND gate AN12 is low, the clock pulse is not applied to the DOWN terminal of the counter CO8. Therefore, the contents of the counter CO8 is maintained "00". On the other hand, when the sliding switch is moved to the "DOWN" position, the clock pulse is applied only to the UP terminal of the counter CO8 for producing the counted signal "01".

Another example is given. Assuming that the contents of the counters CO6 and CO8 are "10" and "00", respectively, one clock pulse produced from the one-shot multi-vibrator as a result of movement of the sliding member to the position "DOWN" causes a reduction in counted value in the counter CO6 from "10" to "01". In this case, since the output from an inverter IN4 is low, the AND gate AN10 is disabled to provide no clock pulse to the UP terminal of the counter CO8. Therefore, the contents of the counter CO8 is maintained "00".

When either one of the counters CO6 or CO8 counts up to "11", a low level signal is produced from either one of the NAND gate NAN0 or NAN2 for preventing further application of clock pulse to the UP terminal thereof.

As apparent from the foregoing, when the number of movements carried out towards "UP" position exceeds the number of movements carried out towards "DOWN" position, the difference in number therebetween is presented as the output signal from the counter CO6 while, in this case, the output signal from the counter CO8 is maintained "00". On the other hand, when the number of movements towards "DOWN" position exceeds the number of movements carried out towards "UP" position, the difference in number therebetween is presented as the output signal from the counter CO8 and, in this case, the output signal from the counter CO6 is maintained "00".

The outputs from the counters CO6 and CO8 are transmitted through a multiplexer constituted by AND gates AN14 to AN20 and OR gates OR11 to OR13 for allowing the signal which is not equal to "00" is transmitted therethrough. The output from this multiplexer through the input terminals P22 and the output from the OR gate OR9 through the terminal p20 are applied to a display device 500 for indicating the degree of increase or decrease effected in the quantity of light from the flash light in terms of EV. Furthermore, from a decoder 320, a signal corresponding to 10 times the value of the signal from the multiplexer in a binary coded form is produced for being applied to the I/O port 460 together with the output signal from the OR gate OR9.

Referring again to FIG. 13, a switch S3 is provided for selecting the mode of calculation between the aperture priority mode and shutter speed priority mode. A reference numeral 330 designates an aperture setting device for producing a signal which is equal to 10 times the set APEX aperture value AVs in the form of binary digits. A reference numeral 340 designates a shutter speed setting device for producing a signal which is equal to ten times the sum of set APEX shutter speed TVs and a constant K5 in a form of binary digits. A reference numeral 350 designates a multiplexer for transmitting the signal 10·AVs from the aperture setting device 330 to the input terminals P12 when the switch S3 is connected to the terminal A for producing high level signal from the terminal p22 and also for transmitting the signal 10·(TVs+K5) from the shutter speed setting device 340 to the input terminals P12 when the switch S3 is connected to the terminal T for producing low level signal from the terminal p22. A reference numeral 360 designates a film sensitivity setting device for producing a signal which is equal to ten times the set APEX film sensitivity 10·SV.

A reference numeral 510 designates a display device for indicating an appropriate aperture value or an appropriate shutter speed. When indicating the appropriate aperture value, the number above the decimal point is converted from APEX numbering system to F stop numbering system and then is displayed, while the number below the decimal point is displayed as it is in the order of 0.1EV. On the other hand, when indicating the appropriate shutter speed, the number above the decimal point is converted from the APEX numbering system to the numbering system for the shutter speed while the number below the decimal point is displayed as it is in the order of 0.1EV. In the case where the set value is found to be over-exposure, [OE] is indicated and in the case where the value is found to be under-exposure, [UE] is indicated, by using suitable display segments.

A reference numeral 520 designates an indication device for indicating the values relative to the quantity of received light QVf under the flash light only or the appropriate aperture value AVf under the flash light. In the case of the quantity of light QVf, the indication is carried out through the APEX numbering system. In the case of aperture value AVf, the indication is carried out through the F-stop numbering system for the number above the decimal point and APEX numbering system for the number below the decimal point. When the light from the flash light is over a predetermined maximum level, [OE] is indicated and when it is under a predetermined minimum level, [OO] is indicated.

A switch S4 is provided for selecting the mode of display on the indication device 520. When the switch S4 is connected to a terminal F, aperture value AVf is indicated. When the switch S4 is connected to a terminal Q, quantity of received light QVf is indicated.

An indication device 530 is provided for indicating the lighting contrast by the APEX numbering system while an indication device 540 is provided for indicating the ratio of light quantity reaching or reflecting on the object to light quantity reaching or reflected on the background, or the ratio of the quantity of light reaching or reflected on the object between the photographs with and without the flash light. Furthermore, the indication device 540 indicates [OO] when the daylight does not make any contribution to the flash light and indicates [NE] when the flash light does not make any contribution to the exposure.

A reference numeral 550 designates an over exposure display device having two indication elements. One of the two indication elements blinks upon receipt of signal from the terminal p26 to warn that the quantity of light from the flash light has caused an overflow in the A-D converter while the other indication element blinks upon receipt of signal from the terminal p25 to warn that the quantity of light from the ambient light has caused an overflow in the A-D converter.

A reference numeral 560 designates an under-exposure display device also having two indication elements. One of the two indication elements blinks upon receipt of signal from the terminal p28 to warn that the quantity of light from the flash light does not make any change in the A-D converter while the other indication element blinks upon receipt of signal from the terminal p27 to warn that the quantity of light from the ambient light does not make any change in the A-D converter.

A reference numeral 570 designates an indication device for indicating the result of comparison of the quantity of light between the lights under the ambient light only and under the flash light only. When the light under the ambient light only is larger than the light under the flash light only, an indication element is lit by a signal from the terminal p30.

A reference numeral 440 designates a CPU of the micro-computer and including an accumulator ACC constituted of 8-bit register. The CPU 400 further includes members such as common working registers #OR to #5R, carry flag CF and zero flag ZF. In addition to above, there are provided arithmetic logic section, address control section, instruction control section and timing control section. It is to be noted that the common working registers may be used in pairs in series connection to form 16-bit pair registers #0PR to #4PR. Since such sections and members are not directly involved in the present invention, the detailed description therefor is omitted for the sake of brevity.

A reference numeral 410 designates a RAM (random access memory) for temporarily memorizing the data obtained during the calculation process in the CPU 440. A reference numeral 420 designates a ROM for memorizing instructions and fixed data. A reference numeral 460 designates an input and output (I/O) port. Shown in FIG. 13 is a microcomputer but only the sections thereof necessary for the description are illustrated. The operation of the microcomputer shown in FIG. 13 is described hereinbelow with reference to a flow chart shown in FIGS. 16a to 16g.

Upon turning on a main switch (not shown) to apply an electric power, the terminal PUC produces a high level signal for a predetermined time interval to the timing control circuit 110 which thereupon produces a signal from the terminal p0 thereof for resetting and starting the micro-computer. More particularly, this reset signal resets the counters shown in FIG. 15 and also rests the CPU 440 in such a manner that the flags are turned to "0", all the registers are made "00H", contents of the RAM 410 is made "00H" and the outputs from the I/O port 460 are all "0". The operation starts from the very beginning.

In the first step, it is waited until the terminal p10 produces a high level signal. In other words, it is waited for the flash light to start emitting the light upon turning on of the switch S. Upon turning on of the switch S, a predetermined time interval T1 seconds is counted in the step 2. This time interval T1 is longer than the time required for the flash light of any kind to emit its total light. Furthermore, upon turning on of the switch S, a signal is produced from the terminal τ5 of the timing control circuit 110 for turning off the transistor FT2 and, at the same time, a signal is produced from the terminal τ7 for turning on the transistor FT3 and turning off the transistor FT1. Thereupon the signal filtered through the high pass filter 200, that is, the signal relative to the flash light only is applied to the integrator for charging the filtered signal across the capacitor C. Therefore, the voltage across the capacitor C is relative to the logarithmically compressed value of the quantity of light under the flash light only, that is, the voltage QVf. Upon completion of the step 2, the terminal p16 produces a high level signal for actuating the A-D converter 22 to start converting the voltage across the capacitor C from analog form to digital form. The analog-digital conversion is carried out in the next succeeding time interval T2 seconds as counted in the step 4. Thereafter, the terminal p18 produces a low level signal for discriminating whether the overflow terminal of the A-D converter 22 is high or not in the step 6. When it is discriminated that the A-D converter 22 has overflowed, the statement proceeds to the step 7 for producing a high level signal from the terminal p26 for blinking the indication element in the over display device 550. In the next step 8, necessary data are applied through the output terminals P16 for effecting the segment display [OE] through the display device. Such display is carried out, for example, by setting data of particular address in the register #PR, using this address for pointing a particular section in the ROM 420, reading data memorized in this particular section, moving the data to the accumulator ACC and producing the signal indicative of the moved data through the output terminals P16. Thereafter, the value "FFH" is set in the register #OR and in the RAM 410 where it is addressed as M1. Then, it is proceeded to the step 14.

In the step 6, when it is discriminated that the A-D converter has not overflowed, the output terminals P1 of the A-D converter 22, is transmitted to the register #OR. In the step 11, it is discriminated whether the contents of the register #0R is "00H" or not. When it is discriminated as "not", the procedure is advanced to the step 14. On the other hand, when it is discriminated as (#OR)=00H, a high level signal is produced from the terminal p28 for blinking the display element in the under display device and, at the same time, the display device 520 displays [OO]. Then, the step proceeds to the step 14. In the above described steps, the measurement of the quantity of light under the flash light as expressed in the form of 10·QVf is completed. The establishment of a value which is 10 times the actual measured value QVf can be carried out by a simple arrangement of circuit factors in the A-D converter 22.

In the step 14, a high level signal is produced from the terminal p12 for producing low level signal from the terminal τ7. Thereupon the transistor FT1 it turned on while the transistor FT3 is turned off. Thereafter, data 10·SV from the input terminals P3 and data 10·AVs or 10·(TVs+K5) from the input terminals P14 are memorized in the registers #2R and #3R, respectively. Then, a high level signal is produced from the terminal p16 for actuating the A-D converter 22 during the next T2 seconds. After the conversion, that is, after the period of T2 second, a low level signal is produced from the terminal p16 and it is discriminated whether the overflow terminal p18 is producing a high level signal or not. When the terminal p18 produces a high level signal, a high level signal is produced from the terminal p25 for actuating the overflow display device to blink the display element and, at the same time, for actuating the display device 510 to display [OE]. Thereafter, it is proceeded to the step 23. In the step 23, a low level signal is produced from the terminal p27. This is for preventing the terminals p25 and p27 from being applied with high level signals at the same time, otherwise both the over and under indication elements confusedly blink if the signal at the terminal p27 has become high upon the production of return instruction described later. Thereafter, the contents of the register #OR, that is, the value 10·QVf, is discriminated whether it is over or zero. When the contents of the register #OR is discriminated as over or zero, the procedure is returned back to the step 15. When the value 10·QVf is neither 00H nor FFH, the value FFH is set in the register #1R while the procedure is jumped to the step 56.

In the step 20, when the overflow terminal p18 produces a low level signal, the step is proceeded to the step 29 for memorizing the output P1 of the A-D converter 22 corresponding to the value 10·(BVa+K5) in the register #1R. It is discriminated whether this value 10·(BVa+K5) is 00H or not in the step 30. When it is discriminated that 10·(BVa+K5)=00H, a low level signal is produced from the terminal p25 in the step 31, and at the next step a high level signal is produced from the terminal p27 for actuating the under display device 560 for blinking the display element thereof and, thereafter, the contents 10·QVf of the register #OR is examined whether it is over a predetermined level or zero. When it is examined that the contents is over the predetermined level or zero, the indication device 510 displays [UE] and the procedure returns back to the step 15. When it is examined that the contents is not over the predetermined level nor zero, the procedure jumps to the step 56.

At the step 30, when it is discriminated that the contents of the register #1R is not 00H, the procedure advances to the step 37 for producing low level signals from the terminals p25 and p27. In this step, in a manner similar to the steps 23 and 31, the one of display elements which may blink due to the high level signal at the terminals p25 or p27 as set in the previous steps is disabled to stop blinking. Thereafter, the contents 10·QVf of the register #OR is discriminated whether it is over the predetermined level or zero. When it is discriminated that the contents 10·QVf of the register #OR is neither over the predetermined level nor zero, the procedure jumps to the step 56.

When the contents 10·QVf of the register #OR is discriminated as to be over the predetermined level or zero, the procedure advances to the step 40 for adding the contents of the register #1R with that of the register #2R while the sum corresponding to the value 10·(BVa+K5)+10·SV=10·(EVa+K5) is set up in the register #1R. Thereafter, the calculation of 10·(EVa+K5)−10·AVs=10·(TVa+K5) or 10·(EVa+K5)−10·(TVs+K5)=10·AVa is carried out. Then, it is examined whether the terminal p22 is producing a high or low level signal. When it is discriminated as high level signal, the switch S3 is connected to the terminal A for setting the aperture value AVs. Therefore, the value obtained in the step 41 is 10·(TVs+K5). This value is examined whether it is greater than the minimum exposure time 10·(TVmax+K5) or not. When it is examined that it is greater, the procedure advances to the step 47, for displaying [OE] on the display device 510 and, at the next step, the data contained in the RAM at the address M1 is moved to the register #OR. Then, the procedure returns to the step 15. According to the steps described so far, the data of the address M1 are FFH or 00H as obtained in the step 9'.

In the step 43, when the contents of the register #1R is smaller than the minimum exposure time 10·(TVmax+K5), it is examined whether the contents of the carry flag is high or low, that is, whether the result of the calculation of the step 41 is negative or positive. When it is examined that the result is negative, the contents of the RAM 420 at the address M1 is moved to the register #OR and, at the next step, [UE] is displayed through the display device 510. Thereafter, the procedure advances to the step 15. On the other hand, when it is examined that the result is positive, that is, when the carry flag is low, the data corresponding to the calculated value TVa is displayed through the display device 510 and, then the procedure returns back to the step 15.

The display in the step 45 is carried out in such a manner that the contents of the register #1R is divided by 10 for obtaining a quotient and a remainder. The quotient, corresponding to the integer part of the APEX value, is used for addressing the ROM 420. The data memorized in the ROM 420, which is addressed by the data corresponding to the quotient, is moved to the accumulator ACC for producing this data through the output terminals P14. The produced data has a meaning of an exposure time and is indicated by means of seven-segment indicator. The remainder, corresponding to the number below the decimal point of the APEX value, is also used for addressing the ROM 420. The data memorized in the ROM 420 as addressed by the remainder is moved to the accumulator ACC for producing necessary data for the segment display through the terminal P14.

In the step 42, when the terminal p22 produces a low level signal, the calculated value corresponds to the value 10·AVa. Even in this case, the value 10·AVa is compared with the value 10·AVmax while the result of the comparison is given by the carry flag. Therefore, on the display device 510, [OE] or [UE] is displayed, or otherwise F-stop number with the number below the decimal point is displayed. Thereafter, the procedure returns back to the step 15. In the step 52, the integer and the number below the decimal point are used, in a manner similar to the step 45, to display the F-stop number and the number below the decimal point through the ROM 420.

In the step 56 as preceded by the steps 27, 34 and 39, the data corresponding to the change in quantity of light 10·Δf is applied from the terminal P10 to the register #4R. At this step 56, the contents 10·QVf of the register #1R is neither over the predetermined level nor zero. Thereafter, the contents 10·QVf of the register #OR is moved to the RAM 410 with the address M1 and, it is discriminated whether the output from the terminal p20 is low or high level signal. When the terminal p20 is producing a high level signal, the quantity of light from the flash light is reduced by the amount as defined by the signal from the input terminals P10. Therefore, in the step 59, the calculation 10·QVf—10·Δf=10·QVf' is carried out while the result thereof is set in the register #OR. In the following steps 60 and 61, it is discriminated whether the result of the calculation in the step 59 is negative or zero. When it is discriminated that the result of the calculation is either negative or zero, [OO] is displayed through the display device 520 and a low level signal is produced through the terminals p30. This step has the same procedure as the steps 23, 31 and 37 in which the lighting illumination element of the device 570 which has been lit as a result of comparison between the lights under the ambient light only and under the flash light only is disabled.

In the following step 64, the contents 10·(BVa+K5) of the register #1R is examined whether it is equal to 00H or not. When it is equal to 00H, [UE] is displayed through the display device 510 and, thereafter, the data corresponding to the value 10·QVf as memorized in the RAM 410 at the section with the address M1 are moved to the register #0R and the procedure returns back to the step 15. In the step 64, when the value 10·(BVa+K5) is not equal to 00H, it is discriminated whether the contents of the register #1R is equal to FFH or not. When it is FFH, the data corresponding to the value 10·QVf memorized in the RAM 410 are moved to the register #OR and the procedure is returned back to step 15. In the step 65, when it is found that the contents of the register #1R is not equal to the value FFH, the procedure returns back to the step 40 for carrying out the previous procedure for the ambient light. Thus, the display device 510 displays [OE] or [UE], or otherwise the aperture value or shutter speed is displayed. Then the data corresponding to the value 10·QVf as memorized in the RAM 410 at the section with the address M1 are moved to the register #OR and, thereafter, the procedure returns back to the step 15. In the step 58, when the terminal p20 is producing a low level signal, the procedure advances to the step 69 in which the calculation 10·QVf+10Δ=10·QVf' is carried out for setting the obtained value in the register #OR. Thereafter, this value in the register #OR is compared with the value 10·QVfmax, that is, the value correspond to the maximum value for the QVf. When the value 10·QVf' is larger than the maximum value 10·QVfmax, a low level signal is produced from the terminal p30 in the step 71. And in the step 72, [OE] data are produced from the output terminals P16 for displaying [OE] through the display device 520. Thereafter, the procedure returns back to the step 64 for displaying [UE], or otherwise displaying an appropriate aperture value or shutter speed through the display device 510. Then, the data corresponding to the value 10·QVf as memorized in the RAM 410 is set in the register #OR while the procedure is returned back to the step 15. In the steps 58 to 73 as described above, it is examined, as a result of Δf change in the 10·QVf, whether the changed value 10·QVf' is equal to zero or greater than the maximum value 10·QVfmax.

When the changed value 10·QVf' is between zero and the maximum value 10·QVfmax, the procedure advances to the step 74 in which the contents 10·QVf' of the register #OR is set in the RAM 410 at the section with the address M2. Thereafter, the calculation 10·QVf'+10·SV=10·AVf is carried out for setting the calculated value to the register #OR. In the following step 76, it is discriminated whether the terminal p24 is producing a high or low level signal, that is, whether the switch S4 is connected to the terminal F or Q. When the switch S4 is connected to the terminal F, F-stop number corresponding to the aperture value AVf and the number below the decimal point are displayed through the display device 520. On the other hand, when the switch S4 is connected to the terminal Q, the value of QVf' is displayed through the display device 520 in terms of APEX value in the order of 0.1 EV in the step 77. Thereafter, it is discriminated whether the contents of the register #1R is equal to the value 00H or not. When it is discriminated as equal to the value 00H, F-stop number corresponding to the aperture value AVf and the value below the decimal point in terms of APEX value are displayed through the display device 510 and, then, the terminal p30 produces a low level signal. Thereupon, the data corresponding to the value 10·QVf as memorized in the RAM 410 is set up in the register #OR and the procedure returns back to the step 15. On the other hand, when the contents of the register #1R is not equal to the value 00H, the contents of the register #1R is examined whether it is FFH or not in the step 80. When it is discriminated that the contents of the register #1R is equal to the value FFH, the operation proceeds through the steps from the step 82 in the same manner described above.

In the step 80, when the contents of the register #1R is not equal to the value FFH, the procedure advances to the step 84 for memorizing the contents 10·(BVa+K5) of the register #1R in the RAM 410 at address M3. Thereafter, the calculation of 10·(BVa+K5)+10·SV=10·(EVa+K5), 10·(EVa+K5)—10·(TVs+K5)=10·AVa or 10·(EVa+K5)—10·AVs=-

10·(TVa+K5) is carried out. In the step 87, it is discriminated whether the signal level from the terminal p22 is high or low. When it is high, the calculation mode is so selected as to calculate the shutter speed so that the procedure advances to the step 89. On the other hand, when it is low, the calculation mode is so selected as to calculate the aperture value so that the procedure advances to the step 128. In the step 89, the contents 1019 (TVa+K5) in the register #1R is compared with the value 10·(TVmax+K5) corresponding to the minimum exposure time. When the contents 10·(TVa+K5) is larger than the minimum exposure time value, the terminal p30 produces a low level signal and the [OE] data are produced from the output terminals P14 for displaying [OE] through the display device 510. Thereafter, the value 10·QVf is set up in the register #0R and the procedure is returned back to the step 15. On the other hand, when the contents 1019 (TVa+K5) is smaller than the minimum exposure time 10·(TVmax+K5), it is further examined whether the value 10·(TVa+K5) is negative or positive. When it is examined as negative, that is, when the carry flag is high, the terminal p30 produces a low level signal and the contents 10·QVf as memorized in the RAm 410 is moved to the register #0R and [UE] data are displayed through the display device 510 and the procedure returns back to the step 15. When the value 10·(TVa+K5) is examined as positive, the signals corresponding to the appropriate aperture value 10·AVf and set aperture value 10·AVs are compared with each other. When the signal relative to the appropriate aperture value 10·AVf is larger than that of the set aperture value 10·AVs, the photograph will be over exposed. Therefore, the terminal p30 produces a low level signal and the [OE] data are produced from the output terminals P14 for displaying [OE] through the display device 510 and the value 10·QVf is set in the register #0R. Thereafter, the procedure returns back to the step 15.

In the step 95, when the signal relative to the appropriate aperture value 10·AVf is smaller than that of the set aperture value 10·AVs, the calculation of 10·AVs−10·AVf=10·Δ3 is carried out for setting this calculated value to the register #3R. Thereafter, the register #2R is set with a predetermined value K6, and the contents of the 16-bits register #2PR is used for addressing the ROM 420 where the data corresponding to the value $-10\cdot\log_2(1-2^{-\Delta 3})$ is previously memorized in accordance with the Table 1. More particularly, at the address K6+10·Δ3 in the ROM 420, data corresponding to the value $-10\cdot\log_2(1-2^{-\Delta 3})$ is memorized. The value from the ROM 420 obtained in the above described manner is moved to the register #0R. In the next step, the contents of the register #0R and those of the register #1R are added with each other so that the calculation of $10\cdot(TVa+K5)-10\cdot\log_2(1-2^{-\Delta 3})=-10\cdot(TVx+K5)$ is carried out. The sum of such calculation is set up in the register #0R. In the step 101, the value 10·(TVx+K5) is compared with the value 10·(TVmax+K5) corresponding to the minimum exposure time. When the value 10·(TVx+K5) is larger than the value 10·(TVmax+K5), the procedure starting from the step 90 is operated and, thereafter, returns back to the step 15. On the other hand, when the value 10·(TVx+K5) is smaller than the value 10·(TVmax+K5), the exposure time and the number below the decimal point of the APEX value are displayed through the display device 510. Thereafter, the value 10·(BVa+K5) which is memorized in the RAM 410 and the value 10·QVf' are set in the registers #1R and #2R, respectively. At the same time, the signal 10·SV produced from the input terminals P3 is set in the register #3R. Thus, in the next step, the calculation of 10#QVf' + 10·SV = 10·AVf is carried out. The answer to this calculation is set in the register #4R. Thereafter, in the step 108, another calculation of 10·AVa=10·(BVa+K5)+10·SV−10·(TVx+K5) is carried out. The answer to this calculation is set in the register #5R. In the following steps 109 and 110, it is discriminated whether the answer to the calculation of the step 108 is smaller than zero or not. When it is discriminated that the answer to the calculation of the step 108 is smaller than zero, a low level signal is produced from the terminal p30 and the QVf' data are produced from the output terminals P18 for displaying a value QVf' in the APEX value through the display device 530 as lighting contrast and, thereafter, the value 10·QVf as memorized in the RAM 410 is set in the register #0R and the procedure returns back to the step 15.

On the other hand, when it is discriminated that the answer to the calculation of the step 108 is now smaller than zero, the procedure advances to the step 114 for comparing the contents 10·AVa of the register #4R with the contents 10·AVf of the register #5R. When the result of the comparison is 10·AVf≧10·AVa, the terminal p30 produces a low level signal and the procedure advances to the step 116 for carrying out the calculation of 10·AVf−10·Ava=10·Δ21. The answer to this calculation is set in the register #1R. On the other hand, when the result of the comparison is 10·AVf<10·AVa, the terminal p30 produces a high level signal for the indication that the employment of flash light for the object is larger than the employment of ambient light for the object and, at the next step, the calculation of 10·AVa−10·AVf=10·Δ21 is carried out. The answer to this calculation is set in the register #1R. Next, in the step 119, the contents of the register #1R corresponding to the lighting contrast is displayed in the APEX value through the display device 530.

In the following step 120, values 10·AVf and 10·AVs are compared with each other. When the result of the comparison is AVf≧AVa, the calculation of 10·(AVa+3.9−AVf)=10·(3.9−Δ21) is carried out. On the other hand, when the result of the comparison is AVa>AVf, the calculation of 10·(AVf+3.9−AVa)=−10·(3.9+Δ21) is carried out. The answer to either one of the calculations is set in the register #3R. As it is apparent from the Table 2, when the value Δ21 is smaller than the value −3.9, the formula $\log_2(1+2^{\Delta 21})$ is classified as having the value zero so that the value 3.9×10=27H is added. On the other hand, when AVf≧AVa the calculation of 10·(AVa+3.9−AVf)=10·(3.9+Δ21) is carried out. The answer to this calculation is set in the register #3R. When the calculation result is not negative, that is, when the carry flag is now level, the register #2R is set with a constant value K7. The contents of the register #2PR is used for addressing the ROM 420 and for reading the data $10\cdot\log_2(1+2^{\Delta 21})$ memorized therein. The data from the ROM 420 is set in the register #0R for displaying this data in the APEX value through the display device 540. Thereafter, data corresponding to the value 10·QVf as memorized in the RAM 410 is set in the register #0R and, then, the procedure returns back to the step 15.

When the result of the calculation of the step 121 is negative, the values 10·AVs and 10·AVf are compared with each other. When the result of the comparison is AVs>AVf, [OO] is displayed through the display device 540. On the other hand, when the result of the comparison is AVs<AVf, [NE] is displayed. Thereafter, the value 10·QVf is set in the register #OR and, the procedure returns back to the step 15.

The procedure after the steps 120 is provided for displaying, in the APEX value, the contrast between the object or portion lighted by the flash light and the background without the flash light or the degree of the effect of the flash light on the exposure. Here, as apparent from Table 2, the difference between the values Ava and AVf is obtained by subtracting the large one from the small one so that the answer $\Delta 21$ always shows a negative value. Then the answer $\Delta 21$ is added with a constant value corresponding to the value 3.9. The sum thereof is used for addressing the ROM 420 and for reading the value $\log_2(1+2^{\Delta 21})$ memorized in the ROM 420. Thereafter, the value corresponding to the read value $\log_2(1+2^{\Delta 21})$ is displayed. When the value $\Delta 21$ is smaller than the value $-3.9$, that is, when the value $\Delta 21 + 3.9$ is smaller than zero, the value $\log_2(1+2^{\Delta 21})$ becomes smaller than the value 0.1. Therefore, when AVf>AVa, [NE] is displayed for the indication that the ambient light does not effect on the exposure. On the other hand, when AVa>AVf, since the flash light does not help to effect on the exposure, [OO] is displayed for the indication that the contrast is zero.

In the step 87, when the terminal p22 is producing a low level signal, the procedure jumps to the step 131. This is carried out when the exposure time TVs is set. In the step 131, the contents of the register #2R is compared with the value 10·AVmax corresponding to the minimum aperture value AVmax. When the result of the comparison is such that the contents of the register #2R is larger than the value 10·AVmax, [OE] is displayed through the display device 510 and, at the next step, a low level signal is produced from the terminal P30. Thereafter, a value 10·QVf is set in the register #OR and, the procedure returns back to the step 15. On the other hand, when the result of the calculation of the step 86 is smaller than zero, the terminal p30 produces a low level signal, and QVf' in the APEX value is displayed through the display device 530. Thereafter, a value 10·QVf is set in the register #OR and, the procedure returns back to the step 15. When the result of the calculation of the step 86 is 0<10·AVa≦10·AVmax, the values AVf and AVa are compared with each other in the step 136. When the result of the comparison is AVf≧Ava, the terminal p30 produces a low level signal and, at the next step, the calculation of 10·Avf−10Ava=10·$\Delta 2$ is carried out. When the result of the comparison is AVa>AVf, the terminal p30 produces a high level signal for indicating that the effect of the ambient light is greater than that of the flash light. Thereafter, the calculation of 10·Ava−10·AVf=10·$\Delta 2$ is carried out. In the step 141, the lighting contrast $\Delta 2$ is displayed in the APEX value through the display device 530.

In the step 142, the values AVf and AVa are compared with each other. When AVf≧Ava, the calculation of 10·(AVa+3.9)−10·AVf=10·(3.9+$\Delta 2$) is carried out. On the other hand, when AVf<AVa, the calculation of 10·(AVf+3.9)−10·AVa=10·(3.9+$\Delta 2$) is carried out. When the result of these calculations is smaller than zero, [NE] is displayed through the display device 540 when AVf>AVa and [OO] is displayed when AVa>AVf in a manner similar to the step 124. Thereafter, the procedure returns back to the step 15.

When the results of these calculations are larger than zero, the obtained value 10·(3.9+$\Delta 2$) is used for addressing the ROM 420. The corresponding value 10·$\log_2(1+2^{\Delta 2})$ obtained from the ROM 420 is set up in the register #2R and is displayed through the display device 540. Thereafter, the contents of the register #2R, that is, the set up value, is added with a larger one of the values AVa and AVf. In other words, either one of the calculations of 10·AVa+10·$\log_2(1+2^{\Delta 2})$=10·AVx or 10·AVf+10·$\log_2(1+2^{\Delta 2})$=10·AVx is carried out. Thereafter, the result of the calculation is compared with the value 10·AVmax. When the calculated value is larger than the value 10·AVmax, [OE] is displayed through the display device 510 and the value 10·QVf is set in the register #OR and, the procedure returns back to the step 15. When the calculated value is smaller than the value 10·AVmax, F-stop number corresponding to the value AVx and the number below the decimal point in the APEX value is displayed through the display device 510. Thereafter, the value 10·QVf is set in the register #OR and, the procedure returns back to the step 15.

By returning procedure back to the step 15 as described above, new exposure information to follow the change in the intensity Bva of the ambient light and/or change in setting of any one of Tv, Sv, Av and $\Delta f$ can be indicated without additional measurement of flash light. The information relating to the flash light measurement once practiced is maintained during the above operation.

Upon pressing the switch button for the second time, the switch is turned off and, thus, a reset signal is produced from the terminal p0 of the timing control circuit 110 as described above with reference to FIG. 14. The reset signal from the terminal p0 resets the micro-computer. Therefore, all the display devices except for the display device for the change $\Delta f$ in quantity of flash light are turned off, while the transistors FT1 and FT4 are turned on and the transistor FT3 is turned off. Now the condition of the photometer is exactly the same as the condition when the source of electric power is supplied.

Figure 17:
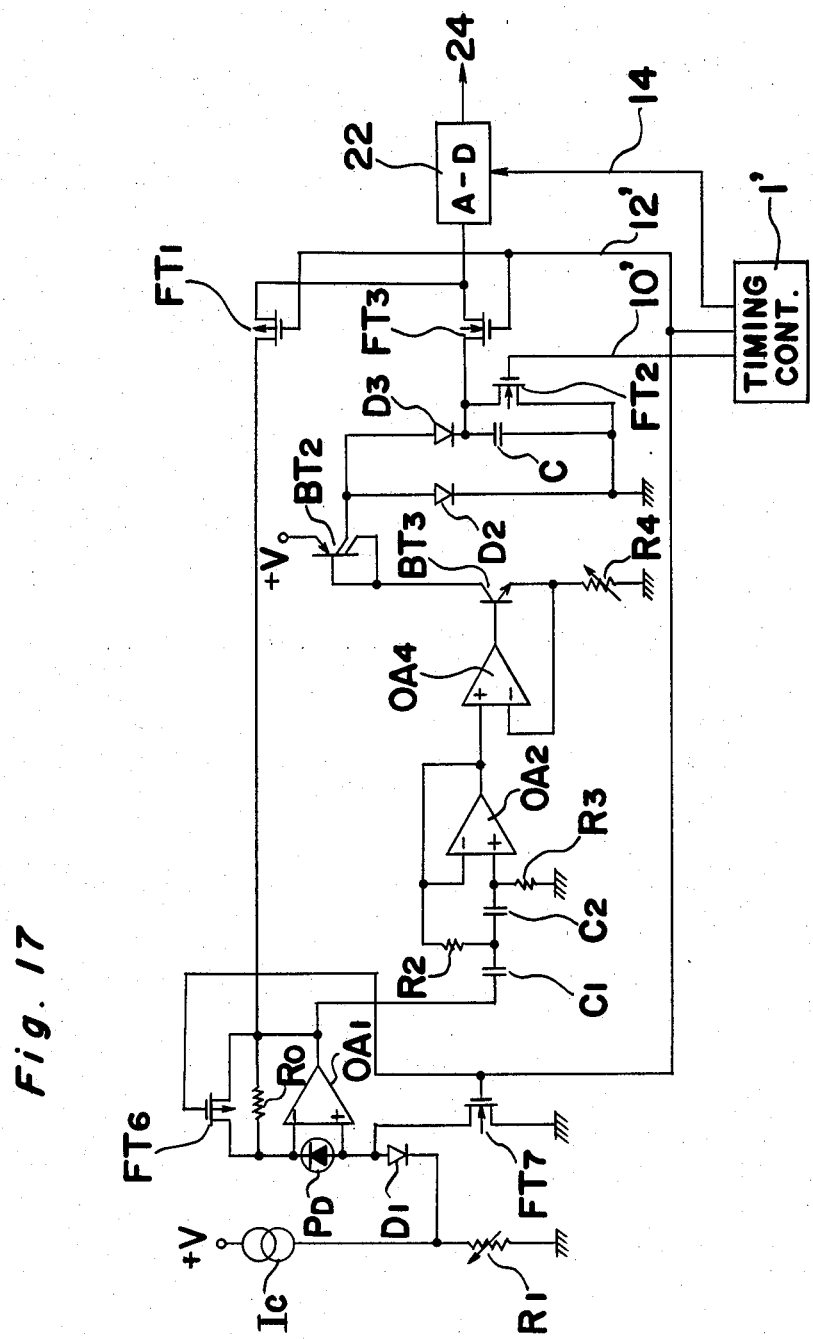
FIG. 17 is a circuit diagram showing a modification of the light measuring circuit shown in FIG. 8, and FIGS. 18 and 19 are block diagrams of light measuring device according to further embodiments of the present invention.

Referring to FIG. 17, a modification of the light measuring circuit illustrated in FIG. 8 is shown. A resistor R0 and a P-channel FET FT6 are connected in parallel to each other between the inverting input and output of the operational amplifier OA1. The non-inverting input of the operational amplifier OA1 is grounded through an N-channel FET FT7. The gates of the FETs FT6 and FT7 are connected to the outputs 12′ of the timing controller 1′. The output of the operational amplifier OA2 is connected to a known voltage-current converter including an operational amplifier OA4, a transistor BT3 and a variable resistor R4. By this voltage-current converter, the voltage signal applied to the non-inverting input of the operational amplifier OA4 is converted into a current signal which flows through the collector of the transistor BT3. The operation of the light measuring circuit shown in FIG. 17 will now be described.

When the switch S (see FIG. 2) is turned on, the flash light 7 emits light and, at the same time, the output 10′ and 12′ of the timing controller 1′ produce low and high level signals, respectively. The low level signal from the output 10′ turns off the N-channel FET FT2. The high level signal from the output 12′ turns on the N-channel FETs FT3 and FT7 and turns off the P-channel FETs FT6 and FT1. Thereupon, the photodiode PD gener- QVt can be eliminated by using the equation $$2^{QVf} + 2^{BVa - TVx} = 2^{QVt} \quad (q-1)$$

Thus, we obtain $$QVf - (BVa - TVx) = \log_2(2^{\Delta 6} - 1) \quad (c-2)$$

Therefore, from the equation (c'''), we obtain $$\log_2(2^{\Delta 6} - 1) = \Delta 5 \quad (c-3)$$

A further calculation in the addition and subtraction circuit 212 and also in the subtraction circuit 214 are carried out in a manner similar to the calculations described above in connection with FIG. 18. The result of the calculation in the subtraction 214 is as follows:

$$TVx = BVa + \Delta 5 - QVf \quad (c-1)$$

An addition circuit 230 and an addition and subtraction circuit 232 are provided for carrying out the following equation:

$$\begin{aligned}
& QVf + \Delta 6 - \Delta 5 \\
&= QVf + QVt - (BVa - TVx) - [QVf - (BVa - TVx)] \\
&= QVt
\end{aligned}$$

for obtaining the total quantity of light expressed by the APEX system.

In the addition circuit 224, the calculation $$QVt + SV = AVx \quad (m-1)$$

is carried out. The results are displayed through the indication circuit 3.

Figure 19:
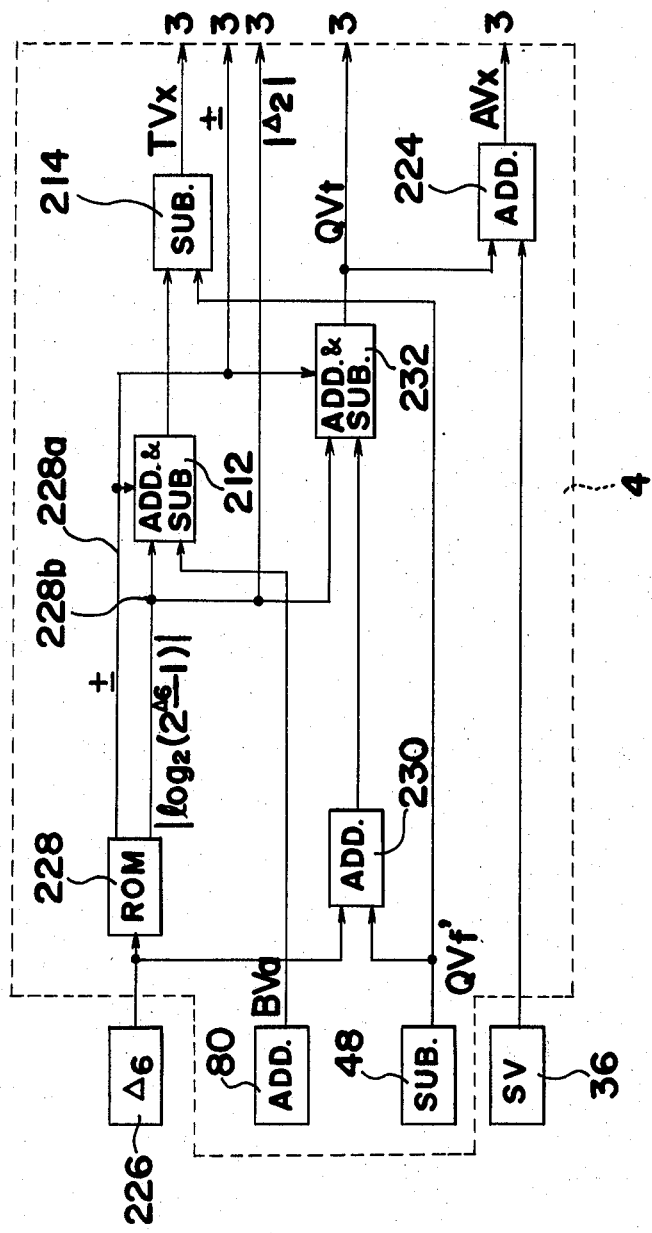

The embodiment shown in FIG. 19 is used for obtaining shutter speed TVx, aperture value AVx, APEX value QVt for the total quantity of light and the lightening contrast when the light quantity of flash light QVf, intensity of ambient light BVa, film sensitivity SV and a desired contrast $\Delta 6$ are given.

It is to be noted that, instead of using the above described method, the shutter speed TVx can be calculated in the following manner.

Namely, after obtaining the value AVfa according to the equation (m), the equation (i10) can be rewritten as follows:

$$2^{AVfa} + 2^{BVa + SV - TVx1} = 2^{AVs} \quad (i11)$$

wherein a value $2^{-TVx1}$ corresponds to a time interval between the moment when the flash light completes its firing and the moment when the exposure time as defined by the value TVx is completed. The procedure for calculating the value TVx is to first obtain the value TVx1 using the equation (i11) and, then, to calculate the value TVx using the values TVx1 and TV1. To begin with, a value $\Delta 5$ is defined as follows:

$$\Delta 5 \equiv AVs - AVfa \quad (S')$$

Eliminating the term AVs by using the equations (i11) and (S') and making the logarithm of the equation, we obtain, $$Tvx1 = BVa + SV - AVfa - \log_2(2^{\Delta 5} - 1) \quad (i)$$

On the other hand, the values TVx1, TV1 and TVx have the following relationship:

$$2^{-TVx} = 2^{-TVx1} + 2^{-TV1} \quad (\alpha')$$

Therefore, if a value $\Delta 4'$ is defined as follows:

$$\Delta 4' \equiv TV1 - TVx1 \quad (\beta')$$

By inserting the equation ($\beta'$) into the equation ($\alpha'$) to eliminate the value TV1 and, then, transforming into logarithm, the following equation can be given:

$$TVx = TVx1 - \log_2(1 + 2^{-\Delta 4'}) \quad (u'')$$

It is further to be noted that the light measuring system as described above can be modified to include a first circuit for integrating the signal including both the preliminary flash light and the ambient light and a second circuit for integrating of the signal obtained through a high pass filter. In this modified construction, when the integrated value obtained from the second circuit is subtracted from the integrated value obtained from the first circuit, it is possible to obtaine information including the light intensity of the ambient light only.

Although the present invention has fully been described by way of examples with reference to the accompanying drawings, it is to be noted that various changes and modifications are apparent to those skilled in the art. Therefore, such changes and modifications, including those described above, are to be understood as included within the true scope of the present invention unless they depart therefrom.

What is claimed is:

1. Light measuring means for use in flash photgraphy, which measures a preliminary flash light to obtain camera exposure information for photography under a primary flash light, comprising:
    means for receiving light;
    means for producing an output in response to said light receiving means;
    first means for integrating the output of said producing means during a first predetermined period of time including at least the duration time of the preliminary flashing to obtain a first signal;
    means for obtaining a second signal including light intensity information without the influence of the preliminary flash light, by utilizing the output of the producing means; and
    means for processing at least said first and second signals to obtain camera exposure information for photography under the primary flash light;
    wherein said producing means comprises means for transmitting said output to said integrating means in a form including influences of both the preliminary flash light and the ambient light intensities; and
    wherein said processing means comprises means for calculating the total amount of only the preliminary flash light received.

2. Light measuring means according to claim 1, wherein said processing means comprises a microcomputer.

3. Light measuring means according to claim 1, wherein said obtaining means comprises second means for integrating the output of said producing means during a second predetermined period of time which does ates a current flowing towards the resistor R0 while the operational amplifier OA1 produces a voltage signal which is in relation to the voltage drop across the resistor R0. The voltage signal from the operational amplifier OA1 is applied to the high-pass filter constituted by capacitors C1 and C2, resistors R2 and R3 and operational amplifier OA2 for producing a signal relative to the AC component in the output voltage from the operational amplifier OA1. The generation of AC component is caused by the increment in light intensity during the emission of flash light. The voltage signal from the high-pass filter is converted into a current signal by the voltage-current converter. The converted current signal is applied through a current mirror type transistor BT2 to the integrator constituted by the diodes D2 and D3 and the capacitor C.

After the period t1, that is, after the emission of light from the flash light 7, the terminal 14 produces a high level signal for actuating the A-D converter 22. At the moment when the A-D converter 22 starts to actuate, the voltage across the capacitor C is in relation to logarithmically compressed value QVf of the quantity of flash light. The high level signal from the terminal 14 continues for a predetermined period of time sufficiently long for carrying out A-D conversion in the converter 22. Then, the terminal 14 produces a low level signal for transmitting the digital data indicative of the value QVf through the demultiplexer 24 (FIG. 2) to the register 26.

Thereafter, the terminals 10' and 12' of the timing controller 1' generates high and low level signals, respectively, for causing the N-channel FETs FT7 and FT3 to nonconductive state and causing the N-channel FET FT2 and the P-channel FETs FT1 and FT6 to conductive state. Accordingly, the input voltage to the A-D converter 22 is equal to the sum of voltage across the adjustable resistor R1 and voltage across the diode D1. Noted that the current flowing through the resistor R1 is supplied from the constant current generator Ic while the current flowing through the diode D1 is supplied from the photodiode PD. Since, at this moment, the flash light 7 has finished the emission of light, the output voltage is in relation to the brightness of luminance BVa under the ambient light. Then the terminal 14 produces a high level signal for a predetermined period of time for effecting A-D conversion and thus, the digital data indicative of the intensity of light BVa is transmitted through the demultiplexer 24 (FIG. 2) to the registor 28.

Figure 18:
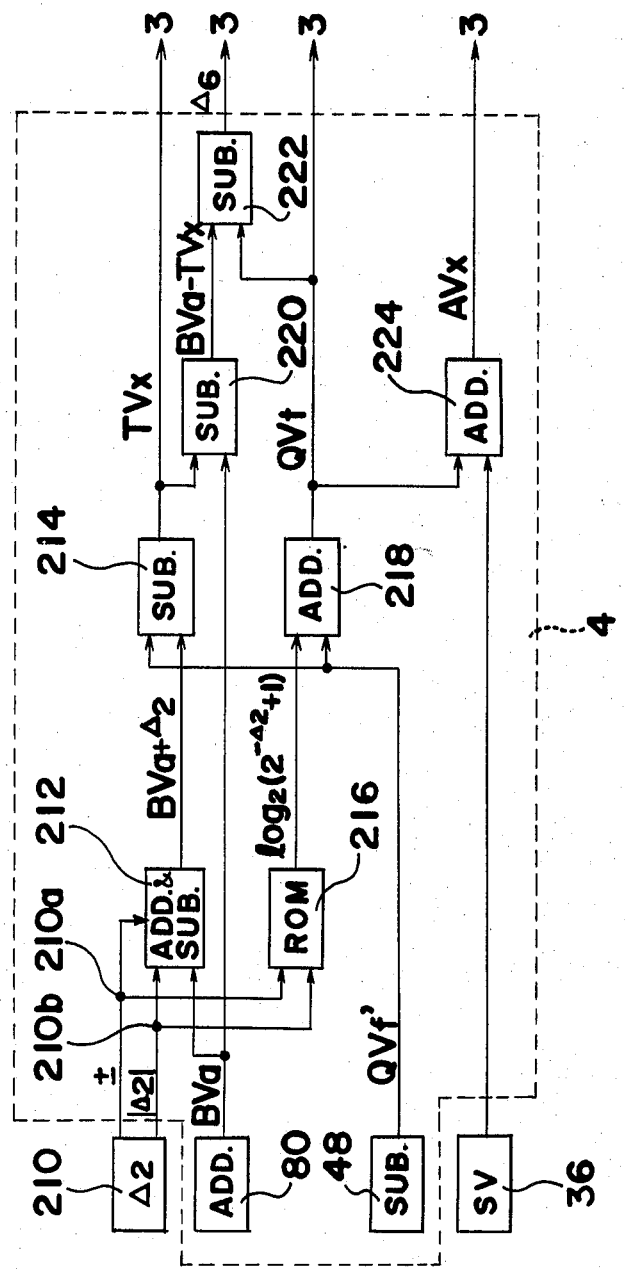

Referring to FIG. 18, a further embodiment of a calculation circuit 4 is shown. This circuit calculates various exposure information when the lighting contrast $\Delta 2$ is given. The various exposure information can be: shutter speed TVx; aperture value AVx; APEX value QVt for the total quantity of light under the ambient light accopanied by flash light; and a contrast $\Delta 6$ between the area lighted by the flash light and the area not lighted by the flash light, that is, the increment in the intensity by the employment of the flash light. The contrast $\Delta 6$ can be expressed as follows:

$$\Delta 6 = QVt - (BVa - TVx) = \log_2(1 + 2^{\Delta 2}) \qquad (l\text{-}2)$$

A $\Delta 2$ setting device 210 produces from a terminal 210a a signal indicating whether the lighting contrast $\Delta 2$ has positive or negative value, and from a terminal 210b a signal indicative of absolute value $|\Delta 2|$ of the lighting contrast $\Delta 2$. In an addition and subtraction circuit 212, a calculation $BVa + |\Delta 2|$ is carried out when signal from the terminal 210a indicates $\Delta 2 \geq 0$ and, a calculation $BVa - |\Delta 2|$ is carried out when signal from the terminal 210a indicates $\Delta 2 < 0$. The calculated value in the circuit 212 is applied to a substraction circuit 214 in which the following calculation is carried out:

$$BVa + \Delta 2 - QVf = TVx \qquad (c\text{-}1)$$

The equation (c-1) corresponds to a modification of the equation (c'''). Therefore, it is understood that we can obtain shutter speed TVx from the equation (c-1).

The signals from the $\Delta 2$ setting device 210 are also applied to a ROM 216 in which data corresponding to the lighting contrast $\Delta 2$ are used for addressing while a datum $\log_2(2^{-\Delta 2} + 1)$ memorized in the addressed area is read out. The read out datum is applied together with a signal from a substraction circuit 48 to an addition circuit 218 for carrying out the following calculation:

$$QVf + \log_2(2^{-\Delta 5} + 1) = QVt \qquad (l\text{-}1)$$

The reason why we obtain the value QVt from the equation (l-1) is that the equation (l-1) can also be obtained by eliminating $(BVa - TVx)$ from the equation (c''') by using a modified equation given as follows:

$$2^{QVf} + 2^{BVa - TVx} = 2^{QVt} \qquad (q\text{-}1)$$

A subtraction circuit 220 is provided for carrying out the calculation $BVa - TVx$ while a subtraction circuit 222 is provided for carrying out the calculation as follows:

$$QVt - (BVa - TVx) = \Delta 6 \qquad (l\text{-}2)$$

In an addition circuit 224, signals from the addition circuit 218 and the SV setting circuit 36 are applied for carrying out the calculation as follows:

$$QVt + SV = AVx \qquad (m\text{-}1)$$

The result of each of the calculations described above is displayed through the indication circuit 3.

The embodiment shown in FIG. 18 is used for obtaining shutter speed TVx, aperture value AVx, APEX value QVt for the total quantity of light under the ambient light accompanied by flash light and the contrast $\Delta 6$ when the light quantity of flash light QVf, intensity of ambient light BVa and film sensitivity SV are given.

Referring to FIG. 19, a still further embodiment of a calculation circuit 4 is shown. This circuit calculates various exposure information when the contrast $\Delta 6$ is given, that is, when the operator sets the value for the contrast between the areas lighted and not lighted by the flash light. In this case, the various information is shutter speed TVx, aperture value AVx, lighting contrast $\Delta 5$ and total quantity of light QVt.

A $\Delta 6$ device 226 produces data $\Delta 6$ for addressing a ROM 228. Then, the ROM 228 produces from a terminal 228a a signal indicating whether the data are positive or negative, and from a terminal 228b a signal indicative of the absolute value $|\log_2(2^{\Delta 6} - 1)|$ which corresponds to the lighting contrast $\Delta 5$ as can be understood by the following reason.

Since $$\Delta 6 = QVt - (BVa - TVx) \qquad (l\text{-}2)$$

not include the duration time of the preliminary flashing, to obtain the second signal.

4. Light measuring means according to claim 3, wherein said first and second integrating means are constructed by a combination of a common integrating circuit serving both as the substantial parts of said first and second integrating means and means for controlling said common integrating circuit to integrate the output of said producing means during said first and second predetermined periods of time in a time sequence.

5. Light measuring means according to claim 1, further comprising means, connected to said processing means, for indicating the total amount of only the preliminary flash light received.

6. Light measuring means according to claim 1, further comprising means, connected to said processing means, for introducing a change in guide numbers between the preliminary and primary flashings into said processing means.

7. Light measuring means for use in flash photography, which measures a preliminary flash light to obtain camera exposure information for photography under a primary flash light, comprising:
   means for receiving light;
   means for producing an output in response to said light receiving means;
   first means for integrating the output of said producing means during a first predetermined period of time including at least the duration time of the preliminary flashing to obtain a first signal;
   means for obtaining a second signal including light intensity information without the influence of the preliminary flash light, by utilizing the output of the producing means; and
   means for processing at least said first and second signals to obtain camera exposure information for photography under the primary flash light;
   wherein said producing means comprises means for transmitting said output to said integrating means in a form including influences of both the preliminary flash light and the ambient light intensities;
   further comprising means, connected to said processing means, for setting film speed infromation and means, connected to said processing means, for indicating an aperture value commensurate with the total amount of only the preliminary flash light received, and wherein said processing means comprises means for calculating said aperture value from said film speed information and said total amount of only the preliminary flash light received.

8. Light measuring means for use in flash photography, which measures a preliminary flash light to obtain camera exposure information for photography under a primary flash light, comprising:
   means for receiving light;
   means for producing an output in response to said light receiving means;
   first means for integrating the output of said producing means during a first predetermined period of time including at least the duration time of the preliminary flashing to obtain a first signal;
   means for obtaining a second signal including light intensity information without the influence of the preliminary flash light, by utilizing the output of the producing means; and
   means for processing at least said first and second signals to obtain camera exposure information for photography under the primary flash light;
   wherein said producing means comprises means for transmitting said output to said integrating means in a form including only a variance component influenced by the preliminary flash light intensity;
   further comprising means, connected to said processing means, for indicating the total amount of only the preliminary flash light received, and wherein said processing means comprises means for providing said indicating means with said total amount of only the preliminary flash light in response to said first signal.

9. Light measuring according to claim 8, wherein said transmitting means is a high-pass filter.

10. Light measuring means according to claim 8, wherein said obtaining means is responsive to the output of said producing means with the preliminary flash light not generated.

11. Light measuring means according to claim 8, further comprising means, connected to said processing means, for introducing a change in guide number between the preliminary and primary flashings into said processing means.

12. Light measuring means for use in flash photography, which measures a preliminary flash light to obtain camera exposure information for photography under a primary flash light, comprising:
   means for receiving light;
   means for producing an output in response to said light receiving means;
   first means for integrating the output of said producing means during a first predetermined period of time including at least the duration time of the preliminary flashing to obtain a first signal;
   means for obtaining a second signal including light intensity information without the influence of the preliminary flash light, by utilizing the output of the producing means; and
   means for processing at least said first and second signals to obtain camera exposure information for photography under the primary flash light;
   wherein said producing means comprising means for transmitting said output to said integrating means in a form including only a variance component influenced by the preliminary flash light intensity;
   further comprising means, connected to said processing means, for setting film speed information and means, connected to said processing means, for indicating an aperture value commensurate with the total amount of only the preliminary flash light received, and wherein said processing means comprises means for calculating said aperture value from said film speed information and said first signal.

13. Light measuring means for use in flash photography, which measures a preliminary flash light to obtain camera exposure information for photography under a primary flash light, comprising:
   means for receiving light;
   means for producing an output in response to said light receiving means;
   first means for integrating the output of said producing means during a first predetermined period of time including at least the duration time of the preliminary flashing to obtain a first signal;
   means for obtaining a second signal including light intensity information without the influence of the preliminary flash light, by utilizing the output of the producing means; and means for processing at least said first and second signals to obtain camera exposure information for photography under the primary flash light;

wherein said processing means comprises means for calculating the total amount of only the preliminary flash light received.

14. Light measuring means according to claim 13, further comprising means, connected to said processing means, for setting a change in guide numbers between the preliminary and primary flashings, and wherein said processing means further comprises means for calculating the total amount of the primary flash light in response to at least said setting means and said means for calculating the total amount of only the preliminary flash light.

15. Light measuring means for use in flash photography, which measures a preliminary flash light to obtain camera exposure information for photography under a primary flash light, comprising:

means for receiving light;

means for producing an output in response to said light receiving means;

first means for integrating the output of said producing means during a first predetermined period of time including at least the duration time of the preliminary flashing to obtain a first signal;

means for obtaining a second signal including light intensity information without the influence of the preliminary flash light, by utilizing the output of the producing means; and means for processing at least said first and second signals to obtain camera exposure information for photography under the primary flash light;

further comprising means, connected to said processing means, for setting film speed information and means, connected to said processing means, for indicating an aperture value commensurate with the total amount of only the preliminary flash light received, and wherein said processing means comprises means for calculating said aperture value.

16. Light measuring means for use in flash photography, which measures a preliminary flash light to obtain camera exposure information for photography under a primary flash light, comprising:

means for receiving light, means for producing an output in response to said light receiving means;

first means for integrating the output of said producing means during a first predetermined period of time including at least the duration time of the preliminary flashing to obtain a first signal;

means for obtaining a second signal including light intensity information without the influence of the preliminary flash light, by utilizing the output of the producing means; and means for processing at least said first and second signals to obtain camera exposure information for photography under the primary flash light;

further comprising means, connected to said processing means, for setting an exposure time and film speed information for flash photography and means, connected to said processing means, for indicating an aperture value commensurate with the sum of the total amount of only the preliminary flash light received and the total amount of ambient light received during the exposure time set by said setting means, and wherein said processing means comprises means for calculating said aperture value.

17. Light measuring means according to claim 16, further comprising means, connected to said processing means, for setting a change in guide number between the preliminary and primary flashing to change the indication of said aperture value indicating means.

18. Light measuring means for use in flash photography, which measures a preliminary flash light to obtain camera exposure information for photography under a primary flash light, comprising:

means for receiving light;

means for producing an output in response to said light receiving means;

first means for integrating the output of said producing means during a first predetermined period of time including at least the duration time of the preliminary flashing to obtain a first signal;

means for obtaining a second signal including light intensity information without the influence of the preliminary flash light, by utilizing the output of the producing means; and means for processing at least said first and second signals to obtain camera exposure information for photography under the primary flash light;

further comprising means, connected to said processing means, for setting an aperture value and film sensitivity information for flash photography and means, connected to said processing means, for indicating an exposure time to achieve an optimum exposure under the ambient light and the primary flash light, and wherein said processing means comprises means for calculating said exposure time.

19. Light measuring means according to claim 18, further comprising means, connected to said processing means, for setting a change in guide number between the preliminary and primary flashing to change the indication of said exposure time indicating means.

20. Light measuring means for use in flash photography, which measures a preliminary flash light to obtain camera exposure information for photography under a primary flash light, comprising:

means for receiving light;

means for producing an output in response to said light receiving means;

first means for integrating the output of said producing means during a first predetermined period of time including at least the duration time of the preliminary flashing to obtain a first signal;

means for obtaining a second signal including light intensity information without the influence of the preliminary flash light, by utilizing the output of the producing means; and means for processing at least said first and second signals to obtain camera exposure information for photography under the primary flash light;

wherein said processing means comprises: first means for obtaining a first information value indicative of the total amount of the preliminary flash light received, by utilizing said first signal; second means for obtaining a second information value indicative of the total amount of the ambient light received during an exposure time during photography, by utilizing said second signal; and means for calculating an information value indicative of the ratio of the first information value to the second information value.

21. Light measuring means according to claim 20, further comprising means for indicating said information indicative of the ratio.

22. Light measuring means according to claim 21, further comprising means, connected to said processing means, for setting a change in guide number between the preliminary and primary flashing to change the indication of said information indicating means.

23. Light measuring means for use in flash photography, which measures a preliminary flash light to obtain camera exposure information for photography under a primary flash light, comprising:
- means for receiving light;
- means for producing an output in response to said light receiving means;
- first means for integrating the output of said producing means during a first predetermined period of time including at least the duration time of the preliminary flashing to obtain a first signal;
- means for obtaining a second signal including light intensity information without the influence of the preliminary flash light, by utilizing the output of the producing means; and
- means for processing at least said first and second signals to obtain camera exposure information for photography under the primary flash light;
- wherein said processing means comprises means for calculating a ratio of a total amount of ambient light received during an exposure time during photography to the sum of the total amount of only the preliminary flash light and the total amount of ambient light received during an exposure time during photography.

24. Light measuring means according to claim 23, further comprising means for indicating said ratio.

25. Light measuring means according to claim 24, further comprising means, connected to said processing means, for setting a change in guide number between the preliminary and primary flashing to change the indication of said ratio indicating means.

26. Light measuring means for use in flash photography, which measure a preliminary flash light to obtain camera exposure information for photography under a primary flash light, comprising:
- means for receiving light;
- means for producing an output in response to said light receiving means;
- first means for integrating the output of said producing means during a first predetermined period of time including at least the duration time of the preliminary flashing to obtain a first signal;
- means for obtaining a second signal including light intensity information without the influence of the preliminary flash light, by utilizing the output of the producing means; and
- means for processing at least said first and second signals to obtain camera exposure information for photography under the primary flash light;
- further comprising means for setting film speed to produce a third signal and means for setting the difference between a logarithm of the total amount of flash light and a logarithm of the total amount of ambient light received during an exposure time to produce a fourth signal, wherein said processing means includes means for calculating a suitable combination of an exposure time and an aperture size from said first to fourth signals to achieve an exposure fulfilling the conditions indicated by said fourth signal.

27. Light measuring means for use in flash photography, which measures a preliminary flash light to obtain camera exposure information for photography under a primary flash light, comprising:
- means for receiving light;
- means for producing an output in response to said light receiving means;
- first means for integrating the output of said producing means during a first predetermined period of time including at least the duration time of the preliminary flashing to obtain a first signal;
- means for obtaining a second signal including light intensity information without the influence of the preliminary flash light, by utilizing the output of the producing means; and
- means for processing at least said first and second signals to obtain camera exposure information for photography under the primary flash light;
- and further comprising means for setting the difference between a logarithm of the total amount of flash light and a logarithm of the total amount of ambient light received during an exposure time to produce a third signal, wherein said processing means includes means for calculating the whole amount of flash light and ambient light received during an exposure time, from said first to third signals.

28. Light measuring means for use in flash photography, which measures a preliminary flash light to obtain camera exposure information for photography under a primary flash light, comprising:
- means for receiving light;
- means for producing an output in response to said light receiving means;
- first means for integrating the output of said producing means during a first predetermined period of time including at least the duration time of the preliminary flashing to obtain a first signal;
- means for obtaining a second signal including light intensity information without the influence of the preliminary flash light, by utilizing the output of the producing means; and
- means for processing at least said first and second signals to obtain camera exposure information for photography under the primary flash light;
- further comprising means for setting the difference between a logarithm of the total amount of flash light and logarithm of the total amount of ambient light received during an exposure time to produce a third signal, wherein said processing means includes means for calculating the difference between a logarithm of the whole amount of flash light and ambient light, and a logarithm of the total amount of ambient light received during an exposure time, from said first to third signals.

29. Light measuring means for use in flash photography, which measures a preliminary flash light to obtain camera exposure information for photography under a primary flash light, comprising:
- means for receiving light;
- means for producing an output in response to said light receiving means;
- first means for integrating the output of said producing means during a first predetermined period of time including at least the duration time of the preliminary flashing to obtain a first signal;

means for obtaining a second signal including light intensity information without the influence of the preliminary flash light, by utilizing the output of the producing means; and means for processing at least said first and second signals to obtain camera exposure information for photography under the primary flash light;

further comprising means for setting film speed to produce a third signal and means for setting the difference between a logarithm of the whole amount of flash light and ambient light, and a logarithm of the total amount of ambient light received during an exposure time to produce a fourth signal, wherein said processing means includes means for calculating a suitable combination of an exposure time and an aperture size from said first to fourth signals to achieve an exposure fulfilling the conditions indicated by said fourth signal.

30. Light measuring means for use in flash photography, which measures a preliminary flash light to obtain camera exposure information for photography under a primary flash light, comprising:

means for receiving light;

means for producing an output in response to said light receiving means;

first means for integrating the output of said producing means during a first predetermined period of time including at least the duration time of the preliminary flashing to obtain a first signal;

means for obtaining a second signal including light intensity information without the influence of the preliminary flash light, by utilizing the output of the producing means; and means for processing at least said first and second signals to obtain camera exposure information for photography under the primary flash light;

further comprising means for setting the difference between a logarithm of the whole amount of flash light and ambient light, and a logarithm of the total amount of ambient light received during an exposure time to produce a third signal, wherein said processing means includes means for calculating the whole amount of flash light and ambient light received during an exposure time, from said first to third signals.

31. Light measuring means for use in flash photography, which measures a preliminary flash light to obtain camera exposure information for photography under a primary flash light, comprising:

means for receiving light;

means for producing an output in response to said light receiving means;

first means for integrating the output of said producing means during a first predetermined period of time including at least the duration time of the preliminary flashing to obtain a first signal;

means for obtaining a second signal including light intensity information without the influence of the preliminary flash light, by utilizing the output of the producing means; and means for processing at least said first and second signals to obtain camera exposure information for photography under the primary flash light;

further comprising means for setting the difference between a logarithm of the whole amount of flash light and ambient light, and a logarithm of the total amount of ambient light received during an exposure time to produce a third signal, wherein said processing means includes means for calculating the difference between a logarithm of the total amount of flash light and a logarithm of the total amount of ambient light received during an exposure time, from said first to third signals.

32. Light measuring means for use in flash photography, which measures a preliminary flash light to obtain camera exposure information for photography under a primary flash light, comprising:

means for receiving light;

means for producing a first output in response to said light receiving means, said first output including the influence of ambient light intensity;

means for producing a second output in response to said light receiving means, said second output including only a variance component influenced by the preliminary flash light intensity; and means for processing at least said first and second outputs to obtain camera exposure information for photography under the primary flash light;

further comprising means, connected to said processing means, for setting an exposure time and film speed information for flash photography and means, connected to said processing means, for indicating an aperture value commensurate with the sum of the total amount of only the preliminary flash light received and the total amount of ambient light received during the exposure time set by said setting means, and wherein said processing means comprises means for calculating said aperture value.

33. Light measuring means for use in flash photography, which measures a preliminary flash light to obtain camera exposure information for photography under a primary flash light, comprising:

means for receiving light;

means for producing a first output in response to said light receiving means, said first output including the influence of ambient light intensity;

means for producing a second output in response to said light receiving means, said second output including only a variance component influenced by the preliminary flash light intensity; and means for processing at least said first and second outputs to obtain camera exposure information for photography under the primary flash light;

further comprising means, connected to said processing means, for setting an aperture value and film sensitivity information for flash photography and means, connected to said processing means, for indicating an exposure time to achieve an optimum exposure under the ambient light and the primary flash light, and wherein said processing means comprises means for calculating said exposure time.

34. Light measuring means for use in flash photography, which measures a preliminary flash light to obtain camera exposure information for a photography under a primary flash light, comprising:

means for receiving light;

means for producing an output in response to only the variance component of the output of said light receiving means;

means for integrating the output of said producing means during a predetermined period of time including at least the duration time of the preliminary flashing to obtain a signal; and means, connected to said integrating means, for indicating a total amount of only the preliminary flash light received, in response to said signal.

35. Light measuring means for use in flash photography, which measures a preliminary flash light to obtain camera exposure information for photography under a primary flash light, comprising:
   means for receiving light;
   means for producing an output in response to only the variance component of the output of said light receiving means;
   means for integrating the output of said producing means during a predetermined period of time including at least the duration time of the preliminary flashing to obtain a signal;
   means for setting film speed information;
   means for calculating an aperture value from said signal of the integrating means and said film speed information; and
   means for indicating said aperture value calculated by said calculating means.

36. Light measuring means for use in flash photography, which measures a preliminary flash light to obtain camera exposure information for a photography under a primary flash light, comprising:
   means for receiving light;
   means for producing an output in response to said light receiving means;
   first means for obtaining an information indicative of the total amount of said preliminary flash light, by utilizing the output of said producing means;
   second means for obtaining a signal including an information of light intensity without the influence of the preliminary flash light, by utilizing the output of the producing means;
   means for setting an aperture value;
   first means for calculating a supplementary aperture value commensurate with said information from said first obtaining means;
   second means for calculating a supplementary exposure time commensurate with the combination of the aperture value set by said aperture value setting means and said signal from said second obtaining means; and
   third means for calculating an exposure time for flash photography, by utilizing said supplementary exposure time, said supplementary aperture value, and said aperture value set by said aperture value setting means.

37. A method for measuring light for use in flash photography, which measures light under a preliminary flashing to obtain camera exposure information for photography under a primary flashing, comprising the steps of:
   integrating a light measuring output during a predetermined period of time including at least the duration time of the preliminary flashing to obtain a first signal;
   obtaining a second signal including light intensity information without the influence of the preliminary flash light; and
   processing at least said first and second signals to obtain camera exposure information for photography under the primary flash light;
   wherein said integrating step achieves an integration of the light measuring output influenced by both the preliminary flash light and the ambient light, and said processing step calculates the total amount of only the preliminary flash light from said first and second signals.

38. A method according to claim 37, wherein said obtaining step and processing steps are repeated without repeating said integrating step for renewing the camera exposure information in response to the change in said second signal.

39. A method for measuring light for use in flash photography, which measures light under a preliminary flashing to obtain camera exposure information for photography under a primary flashing, comprising the steps of:
   integrating a light measuring output during a predetermined period of time including at least the duration time of the preliminary flashing to obtain a first signal;
   obtaining a second signal including light intensity information without the influence of the preliminary flash light; and
   processing at least said first and second signals to obtain camera exposure information for photography under the primary flash light;
   wherein said processing step comprises calculating the total amount of ambient light received during a preset exposure time, from said second signal and a preset exposure time.

40. A method for measuring light for use in flash photography, which measures light under a preliminary flashing to obtain camera exposure information for photography under a primary flashing, comprising the steps of:
   integrating a light measuring output during a predetermined period of time including at least the duration time of the preliminary flashing to obtain a first signal;
   obtaining a second signal including light intensity information without the influence of the preliminary flash light; and
   processing at least said first and second signals to obtain camera exposure information for photography under the primary flash light;
   wherein said processing step comprises reading at least a preset information value and further processing said preset information value with said first and second signals, and wherein at least said processing step is repeated without repeating said integrating step for renewing the camera exposure information in response to the change in said present information.

41. A method according to claim 40, wherein said preset information comprises preset exposure time information.

42. A method according to claim 40, wherein said preset information comprises preset aperture size information.

43. A method according to claim 40, wherein said preset information comprises film speed information.

44. A method according to claim 40, wherein said preset information comprises difference in guide numbers between the preliminary and primary flashings.

* * * * *